(12) United States Patent
Slinger et al.

(10) Patent No.: US 11,640,329 B2
(45) Date of Patent: May 2, 2023

(54) USING AN EVENT GRAPH SCHEMA FOR ROOT CAUSE IDENTIFICATION AND EVENT CLASSIFICATION IN SYSTEM MONITORING

(71) Applicant: BMC Software, Inc., Houston, TX (US)

(72) Inventors: Nigel Slinger, Los Gatos, CA (US); Wenjie Zhu, Dublin (IE)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 17/444,102

(22) Filed: Jul. 30, 2021

(65) Prior Publication Data

US 2022/0318082 A1    Oct. 6, 2022

Related U.S. Application Data

(60) Provisional application No. 63/200,896, filed on Apr. 1, 2021.

(51) Int. Cl.
| | | |
|---|---|---|
| *G06F 11/00* | (2006.01) | |
| *G06F 11/07* | (2006.01) | |
| *G06F 11/30* | (2006.01) | |
| *G06N 20/00* | (2019.01) | |
| *G06F 11/32* | (2006.01) | |

(Continued)

(52) U.S. Cl.
CPC ........ *G06F 11/079* (2013.01); *G06F 11/0772* (2013.01); *G06F 11/2263* (2013.01); *G06F 11/3006* (2013.01); *G06F 11/3075* (2013.01); *G06F 11/327* (2013.01); *G06F 11/3409* (2013.01); *G06N 20/00* (2019.01)

(58) Field of Classification Search
CPC ............... G06F 11/079; G06F 11/0772; G06F 11/2263; G06F 11/3006; G06F 11/3075; G06F 11/327; G06F 11/3409; G06F 11/3447
See application file for complete search history.

(56) References Cited

U.S. PATENT DOCUMENTS

| | | | | |
|---|---|---|---|---|
| 10,291,463 B2 * | 5/2019 | Sykes | ................... | H04L 41/044 |
| 10,496,468 B2 * | 12/2019 | Gefen | ................. | G06F 11/0769 |
| 10,983,856 B2 * | 4/2021 | Zhen | ................... | G06F 11/3058 |

(Continued)

*Primary Examiner* — Elmira Mehrmanesh
(74) *Attorney, Agent, or Firm* — Brake Hughes Bellermann LLP

(57) ABSTRACT

An event graph schema for a technology landscape may be determined, where the technology landscape is characterized using scores assigned to performance metrics. The event graph schema may include a plurality of nodes corresponding to the performance metrics and the scores, and directional edges connecting node pairs of the plurality of nodes, with each directional edge having a score-dependent validity criteria defined by scores of a corresponding node pair. Anomalous scores associated with an event within the technology landscape may be used to find anomalous nodes. Valid edges connecting two of the anomalous nodes and satisfying the score-dependent validity criteria thereof may be used to determine at least one path that includes the valid edges and connected anomalous nodes. In this way, it is possible to traverse the at least one path to identify at least one of the connected anomalous nodes as a root cause node of the event.

21 Claims, 18 Drawing Sheets

(51) Int. Cl.
    *G06F 11/34*         (2006.01)
    *G06F 11/22*         (2006.01)

(56) References Cited

U.S. PATENT DOCUMENTS

| | | | |
|---|---|---|---|
| 2015/0106324 A1* | 4/2015 | Puri | G06F 11/0751 |
| | | | 706/52 |
| 2016/0162346 A1* | 6/2016 | Kushnir | G06F 11/079 |
| | | | 714/37 |
| 2017/0075744 A1* | 3/2017 | Deshpande | H04L 41/0631 |
| 2017/0242773 A1* | 8/2017 | Cirne | G06F 11/3409 |
| 2018/0034685 A1* | 2/2018 | Naous | H04L 41/064 |
| 2019/0286504 A1* | 9/2019 | Muntés-Mulero | G06F 11/0709 |
| 2020/0293917 A1* | 9/2020 | Wang | G06N 5/04 |
| 2021/0141900 A1* | 5/2021 | Brown | G06F 21/566 |
| 2021/0165704 A1* | 6/2021 | Savir | G06F 11/079 |
| 2021/0286798 A1* | 9/2021 | Li | G06F 16/168 |

* cited by examiner

USING AN EVENT GRAPH SCHEMA FOR ROOT CAUSE IDENTIFICATION AND EVENT CLASSIFICATION IN SYSTEM MONITORING

CROSS-REFERENCE TO RELATED APPLICATION

This application claims priority to U.S. Provisional Application No. 63/200,896, filed on Apr. 1, 2021, entitled "ROOT CAUSE IDENTIFICATION AND EVENT CLASSIFICATION IN SYSTEM MONITORING," the disclosure of which is incorporated by reference herein in its entirety.

TECHNICAL FIELD

This description relates to system monitoring.

BACKGROUND

Many companies and other entities have extensive technology landscapes that include numerous Information Technology (IT) assets, including hardware and software. It is often required for such assets to perform at high levels of speed and reliability, while still operating in an efficient manner. For example, various types of computer systems are used by many entities to execute mission critical applications and high volumes of data processing, across many different workstations and peripherals.

Various types of system monitoring methods are used to detect, predict, prevent, mitigate, or cure system faults that might otherwise disrupt or prevent monitored IT assets from achieving system goals. For example, it is possible to monitor various types of performance metrics characterizing aspects of system performance. When monitored values of the detected performance metrics are scored as being outside of a predetermined range, the monitored values may be considered potentially indicative of a current or future system malfunction, and appropriate action may be taken.

Scoring of performance metrics may be performed using machine learning models that are trained using historical data of the performance or operation of IT assets in a system. Such historical data may be used to discern long-term patterns and characteristics that enable accurate assessments of current performance levels and predictions of future performance levels.

Scoring of historical performance or operations metrics results in scores being assigned to many different performance metrics, and groups of performance metrics. Therefore, there may be many different scores generated at a point in time that simultaneously indicate potential anomalies, faults, or other types of problems. Consequently, it may be difficult to discern which score (and underlying IT asset) should be addressed to implement system maintenance or repair in an efficient and effective manner.

SUMMARY

According to one general aspect, s computer program product may be tangibly embodied on a non-transitory computer-readable storage medium and may include instructions. When executed by at least one computing device, the instructions may be configured to cause the at least one computing device to determine an event graph schema for a technology landscape, the technology landscape being characterized by scores assigned to performance metrics for the technology landscape, wherein the event graph schema includes a plurality of nodes corresponding to the performance metrics and the scores, and including directional edges connecting node pairs of the plurality of nodes, each directional edge having a score-dependent validity criterion defined by scores of a corresponding node pair. When executed by at least one computing device, the instructions may be configured to cause the at least one computing device to determine anomalous scores from the scores associated with an event within the technology landscape, and determine, from the anomalous scores, anomalous nodes of the nodes, and determine valid edges of the directional edges, each valid edge connecting two of the anomalous nodes and satisfying the score-dependent validity criterion of the directional edges. When executed by at least one computing device, the instructions may be configured to cause the at least one computing device to determine at least one path that includes the valid edges and connected anomalous nodes, and traverse the at least one path to identify at least one of the connected anomalous nodes as a root cause node of the event.

According to another general aspect, a computer-implemented method may include determining an event graph schema for a technology landscape, the technology landscape being characterized by scores assigned to performance metrics for the technology landscape, wherein the event graph schema includes a plurality of nodes corresponding to the performance metrics and the scores, and including directional edges connecting node pairs of the plurality of nodes, each directional edge having a score-dependent validity criterion defined by scores of a corresponding node pair. The method may include determining anomalous scores of scores associated with an event within the technology landscape, and determining, from the anomalous scores, anomalous nodes of the nodes, and determining valid edges of the directional edges, each valid edge connecting two of the anomalous nodes and satisfying the score-dependent validity criterion of the directional edges. The method may include determining at least one path that includes the valid edges and connected anomalous nodes, and traversing the at least one path to identify at least one of the connected anomalous nodes as a root cause node of the event.

According to another general aspect a system includes at least one memory including instructions, and at least one processor that is operably coupled to the at least one memory and that is arranged and configured to execute instructions. When executed by at least one processor, the instructions may be configured to cause the at least one processor to determine an event graph schema for a technology landscape, the technology landscape being characterized by scores assigned to performance metrics for the technology landscape, wherein the event graph schema includes a plurality of nodes corresponding to the performance metrics and the scores, and including directional edges connecting node pairs of the plurality of nodes, each directional edge having a score-dependent validity criterion defined by scores of a corresponding node pair. When executed by the at least one processor, the instructions may be configured to cause the at least one processor to determine anomalous scores of scores associated with an event within the technology landscape, and determine, from the anomalous scores, anomalous nodes of the nodes, and further to determine valid edges of the directional edges, each valid edge connecting two of the anomalous nodes and satisfying the score-dependent validity criterion of the directional edges. When executed by the at least one processor, the instructions may be configured to cause the at least one processor to determine at least one path that includes the valid edges and connected anomalous nodes, and traverse the at least one path to identify at least one of the connected anomalous nodes as a root cause node of the event.

The details of one or more implementations are set forth in the accompanying drawings and the description below. Other features will be apparent from the description and drawings, and from the claims.

DETAILED DESCRIPTION

Figure 1:
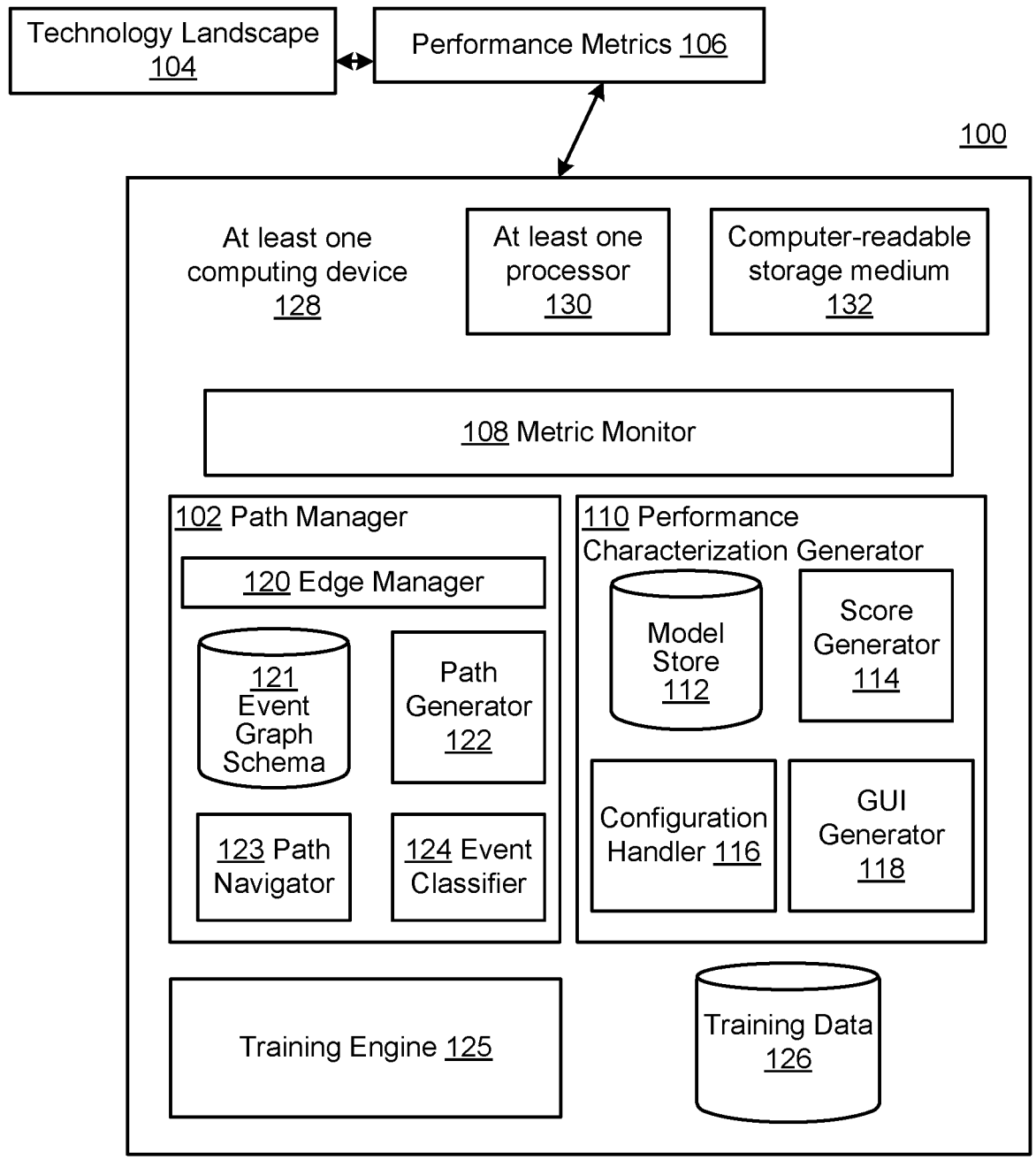
FIG. 1 is a block diagram of a monitoring system with root cause identification and event classification.

Described systems and techniques provide actionable insights to enable asset operation, maintenance, and repair across a technology landscape. Such insights include, e.g., determination of a root cause(s) of a problem, even when many different IT assets have been scored as exhibiting various levels of anomalous behavior. Accordingly, with such insights, problems may be addressed in a timely and efficient manner, and with minimal knowledge, training, and effort required of a system administrator or other user. With such insights, false positives may be reduced and potential anomalies may be predicted.

In providing the above features and advantages, described systems and techniques enable generation of conditionally valid cause and effect relationships between performance metrics (and their underlying system assets), e.g., between pairs of detected system anomalies. Then, currently detected scores or other characterizations of such anomalies may be used to identify or instantiate valid paths among pluralities of the anomalies (e.g., a particular node and associated anomaly), so that a root cause of each such valid path may easily be identified.

Various systems may identify many different types of performance metrics for corresponding system assets. Although widely varying in type, a common scoring system across all of the performance metrics may be used for all such performance metrics for ease and consistency of comparison of current operating conditions (e.g., anomalies).

For example, some performance metrics may include performance metrics commonly referred to as key performance indicators, or KPIs. The term KPI should be understood broadly to represent or include any measurable value that can be used to indicate a past, present, or future condition, or enable an inference of a past, present, or future condition with respect to a measured context (including, e.g., the example contexts referenced below). KPIs are often selected and defined with respect to an intended goal or objective, such as maintaining an operational status of a network, or providing a desired level of service to a user. For example, KPIs may include a percentage of central processing unit (CPU) resources in use at a given time, an amount of memory in use, or data transfer rates or volumes between system components. In a given IT system, the system may have hundreds or even thousands of KPIs that measure a wide range of performance aspects about the system and its operation. Consequently, the various KPIs may, for example, have values that are measured using different scales, ranges, thresholds, and/or units of measurement.

One or more machine learning models may be trained to account for these and other factors and to assign a score to a value or values of a specific KPI or group of KPIs at a given time. Individually or in the aggregate, these scores may be used to provide a performance characterization of a system, a technology landscape, or a portion or portions thereof. Moreover, the scores may be defined with respect to a scale, range, threshold(s), and/or unit of measurement that may be commonly defined across all KPIs. As a result, it is possible to assess and otherwise utilize the resulting individual scores, even for a large number of KPIs.

Given that hundreds or more KPIs may be defined for a given technology landscape, conventional systems may group related KPIs in order to reduce a volume of data displayed or otherwise provided to a user. Even with such groupings, however, a user may be provided with dozens of KPI groups, e.g., with each group being assigned a composite or aggregate score.

Moreover, such scores may change frequently over time. A conventional dashboard or other visual representation may display tens, hundreds, or thousands of scores of all available KPI groups in a grid, with scores being updated every minute, every five minutes, or according to any suitable schedule. Therefore, a user viewing such a visual representation may be faced with a sea of changing score values and may find it difficult to discern any actions to be taken in response thereto.

To assist the user and visually elevate awareness of specific scores, color schemes or other visual techniques may be used. For example, scores within defined ranges may be colored green to indicate a satisfactory condition, yellow to indicate a cautionary condition, and red to indicate an anomaly. Such visual representations may also be helpful in providing an overall sense of a condition of a monitored system, including trending conditions. For example, the displayed grid may primarily have green values, or may primarily have red values, or may be trending from being primarily green to primarily yellow and then red.

Although extremely helpful, such approaches remain limited in many respects. For example, any single anomalous (e.g., red) score value may represent a false positive result, which may happen when the anomalous score is not actually indicative of a problem that requires active maintenance (e.g., may represent a transient problem that will resolve independently in time, without negative effect).

Some existing systems may assign importance levels to KPIs, KPI groups, or KPI scores, in order to assist users in deploying IT assets or other resources. Based on the assigned importance levels, a user may prioritize evaluations of anomalous scores reported. Based on the assigned importance levels, it is possible to configure generation of alerts and alarms with respect to specific KPIs, KPI groups, or KPI scores. Such importance levels, alerts, and alarms may be helpful in many scenarios, but may not be helpful in other scenarios, such as when multiple anomalies have similar importance levels, or when many alerts or alarms are generated at once.

None of the above approaches, nor any other conventional approaches, satisfactorily address cause-and-effect relationships between anomalous scores, e.g., an effect of a malfunction of a first IT asset on a function of a second IT asset. For example, a first asset may exhibit high latency and be assigned an anomalous score, but the high latency may in fact be caused by low memory availability of a second asset. Moreover, such relationships may extend to three or more scores (and underlying assets).

It is possible to construct a decision tree or other conventional graph that attempts to capture such relationships. However, for any realistic number of KPI groups, such conventional graphs may be difficult to render in any practical manner and are therefore not sufficiently helpful in identifying root causes of anomalous behavior.

As referenced above, such anomalous behaviors may change as rapidly as minute-by-minute or faster at lesser time intervals. In so doing, corresponding anomalous scores may trend over time in a manner that may also be informative in identifying or predicting malfunctions and required maintenance activities. As a result, conventional graphing techniques are incapable of providing desired information in a practical or timely manner.

FIG. 1 is a block diagram of an IT asset monitoring system 100. In FIG. 1, a path manager 102 facilitates and provides automatic classification and root cause analysis of anomalous events in the system using, for example, artificial intelligence and machine learning (ML) coupled with a multi-dimensional graph database structure, as described herein.

For example, described embodiments use a multi-dimensional (e.g., 15 dimensional, or 256 dimensional) event graph schema to map relationships between specific performance metrics and associated scores of processes in system 100. Individual cause and effect relationships between pairs of nodes may be coded to build the multi-dimensional graph schema. In example implementations, each relationship allows for a "cause" metric and an "effect" metric each of which may have either a positive or negative value.

Once the multi-dimensional graph schema has been constructed, calculated scores for the various performance metrics may enable the multi-dimensional graph schema to be used to produce a set of eligible or valid paths, in which, for example, the end of a given path may identify a root cause node, e.g., an effect with no causal node available. To reduce the complexity of the resultant set of paths, duplicate subset paths may be removed, and a corresponding superset may be used. Further, the paths may be ordered, e.g., by importance of the elements, or by a length of the path, or both.

In FIG. 1, a technology landscape 104 may represent any suitable source of performance metrics 106 that may be processed for predictions using the system 100. For example, in some embodiments the technology landscape 104 may represent a mainframe computing environment, or any computing environment of an enterprise or organization conducting network-based IT transactions. The technology landscape 104, however, is not limited to such environments. For example, the technology landscape 104 may include many types of network environments, such as network administration of a private network of an enterprise. Technology landscape 104 may also represent scenarios in which sensors, such as internet of things devices (IoT) are used to monitor environmental conditions and report on corresponding status information (e.g., with respect to patients in a healthcare setting, working conditions of manufacturing equipment or other types of machinery in many other industrial settings (including the oil, gas, or energy industry), or working conditions of banking equipment, such as automated transaction machines (ATMs)). In some cases, the technology landscape 104 may include, or reference, an individual IT component, such as a laptop or desktop computer or a server.

The performance metrics 106 may thus represent any corresponding type(s) of data that is captured and reported, particularly in an ongoing, dynamic fashion, and for a potentially large number of performance metrics. For example, in a setting of online sales or other business transactions, the performance metrics 106 may characterize a condition of many servers being used. In a healthcare setting, the performance metrics 106 may characterize either a condition of patients being monitored or a condition of IoT sensors being used to perform such monitoring. Similarly, the performance metrics 106 may characterize machines being monitored, or IoT sensors performing such monitoring, in manufacturing, industrial, energy, or financial settings.

In many of the examples below, which may occur in mainframe or networking environments, the performance metrics 106 may become or include KPIs. In some example implementations, the performance metrics 106 may represent or include the datum in a large repository of stored data. The system 100 may be instrumental in analyzing such data in a highly fast, efficient, customized, and reliable manner, as described herein.

In many implementations, however, the performance metrics 106 represent a real-time or near real-time stream of data that are frequently or constantly being received with respect to the technology landscape 104. For example, the performance metrics 106 may be considered to be received within defined time windows, such as every second, every minute, or every hour.

In FIG. 1, a metric monitor 108 receives the performance metrics 106 over time, e.g., in real time. The performance metrics 106 may be monitored in a manner that is particular to the type of underlying IT asset or resource being monitored. For example, received values (and value ranges) and associated units of measurement may vary widely, depending on whether, for example, an underlying resource includes processing resources, memory resources, or network resources (e.g., related to network bandwidth, or latency).

Additionally, as referenced above, all such values of performance metrics 106 may vary over time, based on a large number of factors. For example, performance metric values may vary based on time of day, time of week, or time of year. Performance metric values may vary based on many other contextual factors, such as underlying operations or seasonality of a business or other organization deploying the technology landscape 104.

In order to capture and account for such factors, while still providing accurate performance characterizations, a performance characterization generator 110 may use one or more trained ML models, represented in FIG. 1 as being stored using a model store 112. A score generator 114 may then score the various performance metric values received through the metric monitor 108 to obtain standardized performance characterizations that are easily interpretable by system administrators and other users, and that may be used in conjunction with one another to provide a multi-variate analysis of desired aspects of the technology landscape 104.

For example, in some scoring systems, threshold values may be set such that scores above or below zero within a first threshold (e.g., from −1.5 to 1.5 in a first approach, or from −3.0 to 3.0 in a second approach) are considered "green," or acceptable; scores outside of the first threshold but within a second threshold (e.g., from −3.0 to −1.5 and from 1.5 to 3.0 in the first approach, or from −6 to −3 and from 3 to 6 in the second approach) are considered "yellow," or cautionary; and scores outside of the second threshold (e.g., less than −3 or more than 3 in the first approach, or less than −6 or more than 6 in the second approach) are considered "red" or anomalous. In similar scoring schemes, other thresholds may be set. For example, an outer ("red") range may be set as less than −3.0 or more than 3.0, or less than −1.5 or more than 1.5.

In additional or alternative scoring schemes, performance metric values may be normalized for scoring between 0 and 100 (or some other minimum or maximum value), where either 0 or 100 may be selected as an optimal value. Then, ranges within the 0 to 100 range may be designated as stable or "green," warning or "yellow," or critical or "red."

These approaches are merely examples, and, as described herein, other scoring values, ranges, and thresholds may be set. To implement these and other approaches, a training engine 125 may be configured to utilize training data 126 to train performance models stored in the model store 112.

For example, the training data 126 may include historical data (e.g., log data) of an owner or operator of the technology landscape 104, so that the performance models of the model store 112 effectively represent what is normal or expected for the particular environment of the technology landscape 104. The performance metrics 106 may thus be compared against the trained performance models to enable calculation of corresponding scores, as referenced above.

Thus, such scores may be understood to provide, for example, a measure of an extent to which a raw value differs from its modeled mean in terms of standard deviation units. In such examples, the above-referenced scores of ±1.5 represent 1.5 standard deviations from the mean, and the scores of ±3.0 represent 3 standard deviations from the mean. Model sensitivity levels may be set to dictate values of a normal range and the ranges of levels of deviation.

For example, a configuration handler 116 may be provided to enable a system administrator or other user to designate or otherwise configure sensitivities or other aspects of the scores provided by the score generator 114. For example, a provider of the performance characterization generator 110 may specify default values, thresholds, or ranges, but the configuration handler 116 may provide a user with an ability to modify these defaults in a desired manner. The configuration handler 116 may also be used to configure aspects of operations of the path manager 102, as referenced in various examples, below.

A graphical user interface (GUI) generator 118 may be configured to generate any suitable GUI that displays a performance characterization in a desired manner. Specific examples of such GUIs are included below. In general, however, a generated GUI may display any specified performance metrics, or groups or combinations thereof. A generated GUI may display time periods during which performance metrics were captured or scored. A generated GUI may display specific systems or subsystems of the technology landscape 104 that are scored. Different views may be included, such as a status view, a timeline view, a graph view, or an analytics view.

A generated GUI may display many other performance characterizations that are not discussed here in detail. For example, a generated GUI may characterize scoring trends over time of one or more performance metric scores, e.g., as a way of predicting a future malfunction. In specific examples described herein and related to operations of the path manager 102, the GUI generator 118 may be configured to generate one or more GUIs that display results of the path manager 102, such as illustrated in FIGS. 2-4 and FIGS. 7-14.

The path manager 102 may be configured to facilitate construction and use of a graph control file that codes, and enables generation of visual representations of, the type of multi-dimensional graph referenced above. In described examples of such multi-dimensional graphs, individual graph nodes each correspond to performance metrics (or groups thereof) and corresponding scores, while edges represent conditionally valid cause-and-effect directional relationships between each corresponding pair of nodes of the plurality of nodes and may include directional edges connecting node pairs. As described in detail, below, each such directional edge may be associated with a score-dependent validity criterion defined by scores of its corresponding node pair.

Thus, for example, the path manager 102 may include an edge manager 120. The edge manager 120 may be configured to receive characterizations of graph relationships to be illustrated as directional edges (e.g., cause-and-effect relationships between pairs of graph nodes), and related information. For example, as just referenced, the edge manager 120 may receive or determine for each edge score-dependent validity criterion that will determine whether the edge is valid at a given point in time, based on a combination of node scores at that point in time.

For example, a graph relationship may indicate that an anomaly with a "local contention" node may cause a problem with a "throughput" node. In another example, an anomaly with the "throughput" node may cause a problem with a "thread management" node. Such anomalies will be reflected in corresponding, abnormal node scores, as described above. In conventional systems, however, the types of cause-and-effect relationships just referenced are difficult or impossible to discern from individual ones of such anomalous scores, particularly for large numbers of nodes and/or scores.

In FIG. 1, the edge manager 120 is configured to capture or otherwise determine all known cause-and-effect relationships between pairs of nodes (and associated performance metrics, or groups of performance metrics). The resulting nodes and directional edges, and score-dependent validity criteria of each edge, may be stored in an event graph schema 121 illustrated in FIG. 1. That is, the event graph schema 121 represents a file structure in which all possible or known cause-and-effect relationships between pairs of nodes (and associated attributes and constraints) are included. During use of the event graph schema 121 (e.g., in particular instances thereof), only some subset of those cause-and-effect relationships will be determined to be valid edges at a given point in time and for a given set of node scores.

Figure 2:
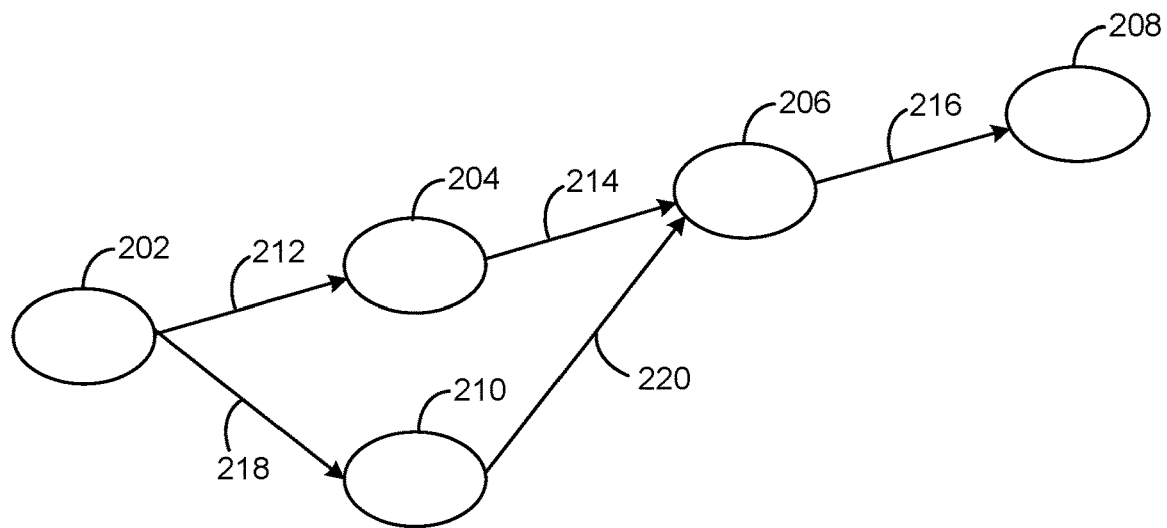
FIG. 2 is a simplified example of a rendering of an event graph schema used by the monitoring system of FIG. 1.
Figure 3:
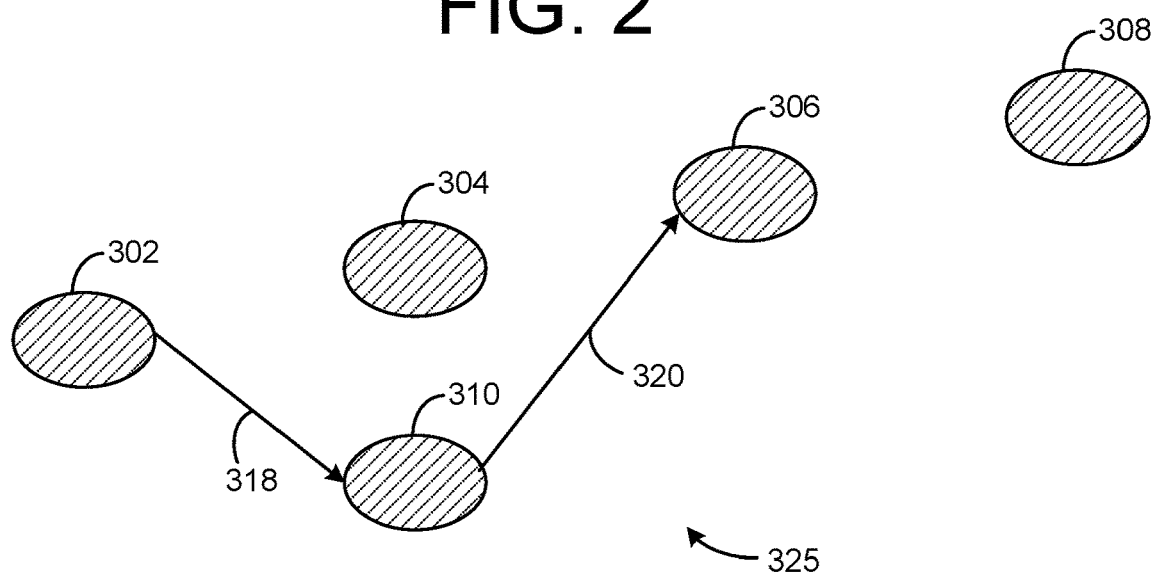
FIG. 3 is a first example of a path that may occur in the example of FIG. 2.
Figure 4:
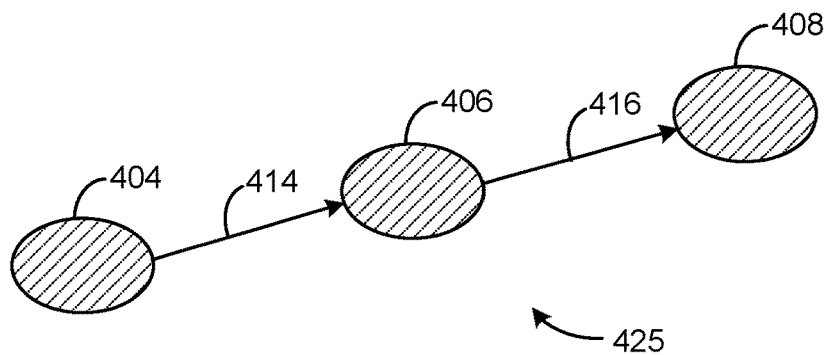
FIG. 4 is a second example of a path that may occur in the example of FIG. 2.
Figure 6:
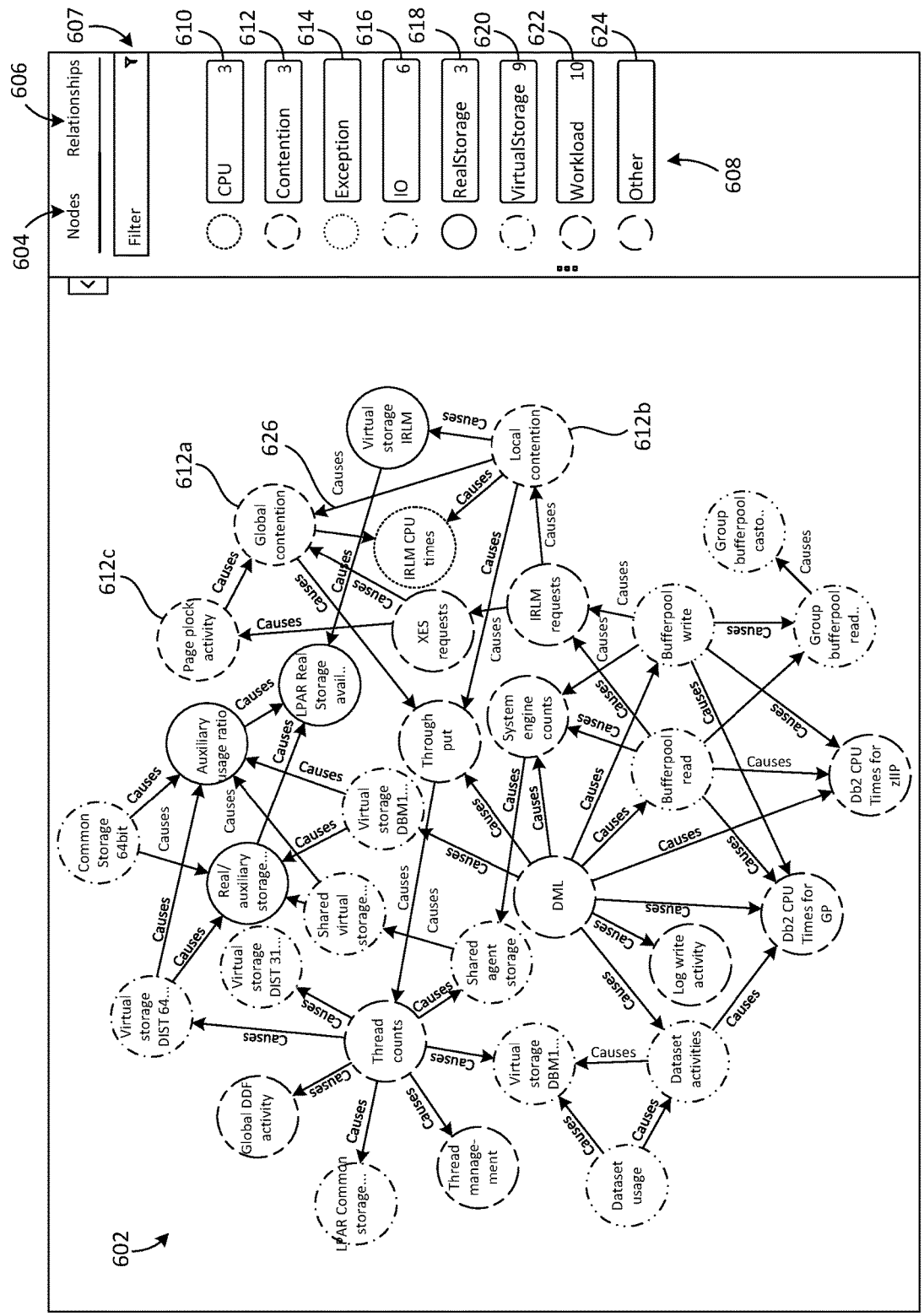
FIG. 6 is a more detailed example of a rendering of an event graph schema of FIG. 2.

For example, as described in detail below, FIG. 2 provides a simplified example of a rendering of the event graph schema 121, and FIGS. 3 and 4 illustrate corresponding instances at points in time, at which valid edges have been determined to form one or more paths. Similarly, for example, FIG. 6 illustrates a more detailed rendering of the event graph schema 121, and FIGS. 7-12 illustrate corresponding instances at points in time at which valid edges have been determined to form one or more paths.

In FIG. 1, the path manager 102 includes a path generator 122 that is configured, at a point in time and/or for a given set of scores, to instantiate the event graph schema 121 to determine currently-valid paths through the event graph schema 121. That is, for example, the path generator 122 may process a graph control file from which the example of FIG. 2 (or FIG. 6) is rendered, using scores at corresponding points in time, to determine the paths of FIGS. 3 and 4 (or, e.g., of FIGS. 7-12).

A path navigator 123 may be configured to traverse or otherwise navigate the resulting paths to determine a probable or root cause of any associated event. As a result, it is possible for a user of the system 100 of FIG. 1 to quickly determine a root cause anomaly and focus remediation efforts accordingly. As a result, for example, a time to resolution of an event may be improved and system downtime may be reduced.

As a result of the above-described operations, the path manager 102 effectively collects, over time, multiple paths and associated event data. Consequently, it is possible to use such path and event data to generate labelled training data, which correlates types and characteristics of events with corresponding paths, scores, and root cause nodes over time. For example, the labelled training data may be stored with the training data 126, or separately.

Then, an event classifier 124 may be trained using the labelled training data, e.g., using supervised ML techniques implemented by the training engine 125 (or another training engine). Such supervised ML techniques may conventionally be difficult to implement, for example, due to the lack of availability of such labelled training data. For example, such labelled training data might typically be required to be generated manually, and/or in conjunction with actual failures or other malfunctions of the technology landscape 104.

In FIG. 1, however, as just referenced, the path manager 102 effectively generates data that may be used as labelled training data. As a result, the event classifier 124 may be configured, e.g., trained, to predict future or impending events, including predictions of root cause failures of nodes at which prevention efforts should be focused. Consequently, in such instances, system downtime, cost, latency, and other aspects may be further improved.

In FIG. 1, the path manager 102 is illustrated as being implemented using at least one computing device 128, including at least one processor 130, and a non-transitory computer-readable storage medium 132. That is, the non-transitory computer-readable storage medium 132 may store instructions that, when executed by the at least one processor 130, cause the at least one computing device 128 to provide the functionalities of the path manager 102 and related functionalities.

For example, the at least one computing device 128 may represent one or more servers. For example, the at least one computing device 128 may be implemented as two or more servers in communications with one another over a network. Accordingly, the path manager 102, the performance characterization generator 110, and the training engine 125 may be implemented using separate devices in communication with one another. In other implementations, however, although the path manager 102 is illustrated separately from the performance characterization generator 110, it will be appreciated that some or all of the respective functionalities of either the path manager 102 or the performance characterization generator 110 may be implemented partially or completely in the other, or in both.

As referenced above, FIG. 2 is a rendering of a simplified example of the event graph schema 121 used by the monitoring system 100 of FIG. 1. FIG. 3 is a first example of a path that may occur in the example of FIG. 2, and FIG. 4 is a second example of a path that may occur in the example of FIG. 2.

FIG. 2 represents, for example, a static rendering that is not dependent, as displayed, on actual score values of any of the displayed nodes. For example, FIG. 2 may be rendered using any suitable graph database tool, e.g., as a design-time visualization used by a system administrator or other user who is inputting or validating the set of cause-and-effect relationships.

In FIG. 2, illustrated nodes 202, 204, 206, 208, 210 each represent either a performance metric (or a group of related performance metrics) for one or more IT assets or resources of the technology landscape 104 that may be scored by the score generator 114 using the techniques referenced above, or similar techniques. For example, the node 202 may be associated with performance metrics and associated scores related to a certain type of lock request, such as an Internal Resource Lock Request (IRLM). The node 204 may be related to local contention metrics, the node 206 may be related to global contention metrics, and the node 208 may be related to throughput metrics. The node 210 may be related to certain types of data sharing services, such as cross-system extended services (XES).

Further in FIG. 2, edge 212 connects nodes 202 and 204, edge 214 connects nodes 204 and 206, and edge 216 connects nodes 206 and 208. Edge 218 connects nodes 202 and 210, and edge 220 connects nodes 210 and 206. That is, as described herein, each edge represents a conditionally valid cause-and-effect directional relationship between each corresponding pair of nodes. For example, conditions to be evaluated to determine a validity of an edge may be defined with respect to current scores, or combinations of scores, of the nodes connected by that edge. For example, edge 212 may only be determined to be valid when scores of both the nodes 202 and 204 are anomalous.

In other examples, when anomalous scores may be either negative or positive in value (e.g., below −1.5 or above 1.5), conditions for validity of the edge 212 may depend on combinations of score signs as well as score values. For example, the edge 212 may be valid when scores of the nodes 202 and 204 are both anomalous and positive, or both anomalous and negative, or when one of the node scores is anomalous and positive and the other node score is anomalous and negative.

Thus, each edge may be associated with a score-dependent validity criterion, which may be expressed as a bit pattern. Continuing the above examples, the edge 212 may have a score-dependent validity criterion expressed as a 4-bit bit pattern $[x_1, x_2, x_3, x_4]$, where x can be 1 or 0. For example, $x_1$ may represent validity when both node scores are positive, $x_2$ may represent validity when both node scores are negative, $x_3$ may represent validity when a first node score is positive and a second node score is negative, and $x_4$ may represent validity when the first node score is negative and the second node score is positive.

Thus, for a bit pattern [1101], edge validity, which may also be referred to as edge instantiation, occurs when both node scores are positive, or when both scores are negative, or when the first node score is negative and the second node score is positive. Consequently, in each of these three scenarios, the edge 212 would be valid and would be path-eligible to be included in a path within an instance of the event graph schema 121 at a corresponding point in time. When the first node score is positive and the second node score is negative, however, edge 212 would not be valid and would not be path-eligible, i.e., would not be included in any path within an instance of the event graph schema 121 at a corresponding point in time.

In more specific examples, such graph relationships may be encoded as: (BufferpoolRead)-[:CAUSES {value: '1101'}]→(IRLMRequests); (BufferpoolRead)-[:CAUSES {value:'1011'}]→(SystemEngineCounts); (BufferpoolWrite)-[:CAUSES {value:'1101'}]→(GroupBufferpoolRW); (BufferpoolWrite)-[: CAUSES {value:'1101'}]→(IRLMRequests).

Therefore, such graph relationships may be understood to be potentially multi-dimensional. That is, representing the types of potential relationships described above in a binary or vector format, such as the 4-bit bit pattern just referenced, results in 15 possible dimensions or relationships between a pair of nodes (excluding a $16^{th}$ dimension in which no relationship exists). In addition to being multi-dimensional as just described, the graph relationships may be bidirectional, so that each node of a pair of nodes may be a cause and/or an effect node with respect to its partner node of the pair.

Moreover, many more dimensions may easily be encoded. For example, an 8-bit bit pattern may be used to provide 256 dimensions in which relationships are defined between anomalous score ranges as well as between score signs. For example, as referenced above, scores may have ranges defined between 0 and −1.5, and between −1.5 and −3.0, and below −3.0, as well as scores defined between 0 and 1.5, and between 1.5 and 3.0, and above 3.0. Then, relationships may be defined using these ranges. For example, a relationship may be defined as having a score-dependent validity criterion that includes a second node being affected by a first node only when the second node has an anomalous score above 3.0 and the first node has an anomalous score below −1.5.

As may be observed, even when defining relationships using score ranges, score signs, and other score aspects, the defined relationships and associated score-dependent validities may be completely defined on just a pairwise basis between nodes. That is, a developer or administrator may only be asked to enter potential relationships between individual pairs, without being asked or required to consider paths between three or more nodes, or two or more edges, that may result.

For example, the edge manager 120 may receive such pairwise relationships from a developer, system administrator, or other user for storage with corresponding node pairs in a graph control file. The graph control file enables construction of the event graph schema 121, which may be rendered as shown in FIG. 2, or FIG. 6. Once constructed, the encoded graph control file and associated event graph schema from which FIG. 2 is rendered may be then provided for active customer use, as shown in FIGS. 7-12.

For example, the graph control file may be provided as the event graph schema 121, e.g., using a JavaScript Object Notation (JSON) file corresponding to the structure of FIG. 2. As referenced above, and described in detail below, such a JSON file may then be traversed during a system runtime (e.g., using a Java-coded path generator 122 and/or path navigator 123), to display valid edges and corresponding paths through the graph of FIG. 2 at a point in time, as shown in FIGS. 3 and 4.

More generally, the types of cause-and-effect graph relationships just described may be constructed using one or more of a combination of techniques. For example, the relationships may be constructed using unsupervised ML techniques, such as cluster-based techniques, or other types of correlation analyses.

FIG. 2 may be used to provide and verify information regarding an actual multi-dimensional nature of the graph control file and associated event graph schema 121. For example, a user may hover over, or otherwise select, a particular graph relationship (edge), whereupon a display of further attributes of the relationship may be provided. For example, in response to selecting a particular edge, a display may be provided indicating that the relationship is only valid in provided circumstances, such as when both nodes are associated with positive value anomalous scores.

Once encoded using the above or similar techniques, the multi-dimensional graph representation of FIG. 2 may be provided as a simplified representation of the cause-and-effect relationships from which potential graph edges may be rendered so that all potential paths through two or more of the displayed nodes are also rendered. Then, once deployed during active scoring operations of the score generator 114, the path manager 102 may dynamically validate and update individual edges based on received scores in order to determine currently valid paths.

For example, for clarity and differentiation from FIG. 2, in FIG. 3, all of the nodes 302 through 310 are designated by hatching to indicate that anomalous scores have been assigned to their underlying performance metrics and associated IT assets or resources.

Similar numbering is used with respect to edges 212 through 220, so that, as shown in FIG. 3, the edges 318 and 320 have been determined to be valid. That is, the edge 318 may be evaluated by the path generator 122 based on current scores of the nodes 302 and 310 and determined to be valid. Similarly, edge 320 may be evaluated by the path generator 122 based on current scores of nodes 310 and 306, and determined to be valid. Consequently, a path 325 may be identified that includes the nodes 302, 310, and 306, and intervening valid edges 318 and 320.

In the example of FIG. 3, the nodes 304 and 306 are also indicated (by hatching) to be scored with anomalous scores. Nonetheless, for example, the edge 212 is not instantiated or included in the example of FIG. 3, because the combination of scores of nodes 302 and 304 do not support validation of the edge 212 for potential inclusion in a path. Similar comments apply to edge 214 with respect to the nodes 304 and 306, edge 220 with respect to the nodes 310 and 306, and edge 216 with respect to the nodes 306 and 308.

Similarly, in the example of FIG. 4, node 404 and node 406 (i.e., scores thereof) may be evaluated to determine a validity of the edge 414 therebetween. Similar comments apply to the edge 416 with respect to scores of the nodes 406 and 408. As a result, a path 425 may be identified.

In FIG. 4, the nodes 202 and 210 of FIG. 2 may have scores within normal ranges (e.g., between −1.5 and 1.5), and therefore connected edges 212, 218, and 220 may be determined to be ineligible for evaluation. In the example, the nodes 202 and 210, and edges 212, 218, and 220, are therefore removed. In other implementations, the nodes 202 and 210, and edges 212, 218, and 220 may be included in a display with the path 425, but may be provided with visual indicators that the scores of nodes 202 and 210 are within a normal range, and that the edges 212, 218, and 220 are not valid. For example, the nodes 202 and 210 and the edges 212, 218, and 220 may be provided in a different color (e.g., greyed out).

FIGS. 3 and 4 therefore illustrate that an event graph schema, corresponding to the example of FIG. 2, may be instantiated using current scores at a point in time to determine paths 325 and 425, e.g., using the path generator 122. Although shown as including three nodes and two edges in the examples of FIGS. 3 and 4, it will be appreciated that a path may include virtually any available length of nodes and edges. Similarly, although FIGS. 3 and 4 illustrate only a single path each, it will be appreciated that multiple paths may occur at a single point in time and corresponding instance of the event graph schema of FIG. 2.

Additionally, the path generator 122 may perform additional path processing. For example, a first path identified may be a subset of a second path and may be consolidated into the second path. In other examples, a minimum path length may be set, e.g., defined in terms of a minimum number of edges and/or nodes. Then, the path generator 122 may filter any paths that are less than the minimum number.

In some implementations, however, a limit breach score value may be assigned that supersedes such filtering of paths and otherwise takes priority with respect to identifying and evaluating valid paths. For example, a limit breach may refer to a threshold that indicates a severe exception or other problem has occurred, or is occurring. Such a threshold may be defined with respect to a score that is beyond a maximum defined deviation or scoring range, and/or may be defined with respect to a direct measurement or characterization of an underlying resource or asset.

For example, a memory resource may have a threshold defined with respect to a percentage of the resource being used, and conceptually similar thresholds may be defined with respect to processing resources, network latencies, and virtually any other performance metric being monitored. Such outlying values may thus correspond to anomalous scores well beyond a defined deviation scoring range (e.g., −3.0 to 3.0).

If present and detected, such limit breaches may be prioritized in various manners. For example, a limit breach may be sufficient to include a node within a path, even if the node or path would not otherwise have been included (e.g., would have been filtered out as being below a minimum path length). In other examples, when a current instance of an event graph schema includes multiple paths, a node or path that includes a limit breach may be sorted to the top of such multiple paths or otherwise identified for prioritized processing, including, e.g., root cause identification and remediation.

Once at least one path has been generated by the path generator 122, the path navigator 123 may proceed to navigate the path(s) to identify a probable root cause node associated with one or more events related to the anomalous scores of the path nodes. For example, the path navigator 123 may begin at a node that is a final node of a path, such as the node 306 in FIG. 3 or the node 408 in FIG. 4, which is an effect node but not a cause node. Then, the path navigator 123 may proceed against directions of the directional edges 320 and 318, or against the directions of the directional edges 416 and 414, moving from effect node to a cause node until a first cause node of the path 325 or 425 is reached.

In some cases, then, the first node of a path may be identified as the root cause node (e.g., node 302 of FIG. 3, or node 404 of FIG. 4). In other cases, however, the first node may not be the root cause node. For example, a path inversion technique may be used by the path navigator 123 to determine whether the first node qualifies as a probable root cause node. If it does not, then the path navigator 123 may proceed forward in the direction of an edge exiting the first node, toward a second node, to perform a similar analysis. This process may continue until a root cause node is determined.

For example, as scores may represent deviations from a determined normal value for a given IT asset or resource, a negative score may indicate an abundance of a resource, while a positive score may indicate a lack of the same resource. For example, for a memory resource that has scores associated with normal memory usage levels, a low score may represent that the memory resource is being used less than expected, while a high score might indicate that the memory resource is being used more than expected.

Although low memory usage may be associated with an event, in many circumstances, low memory usage may not be likely to be the root cause of the event. Accordingly, the path navigator 123 may execute path inversion if a first node of a path is related to memory usage and has a low anomalous score, and may proceed forward in a direction of an edge exiting the first node to a second node of the path to determine a root cause node. On the other hand, a first path node related to memory usage and exhibiting a high anomalous score may qualify to be labelled as a probable root cause node for the path and/or an associated event.

Figure 5:
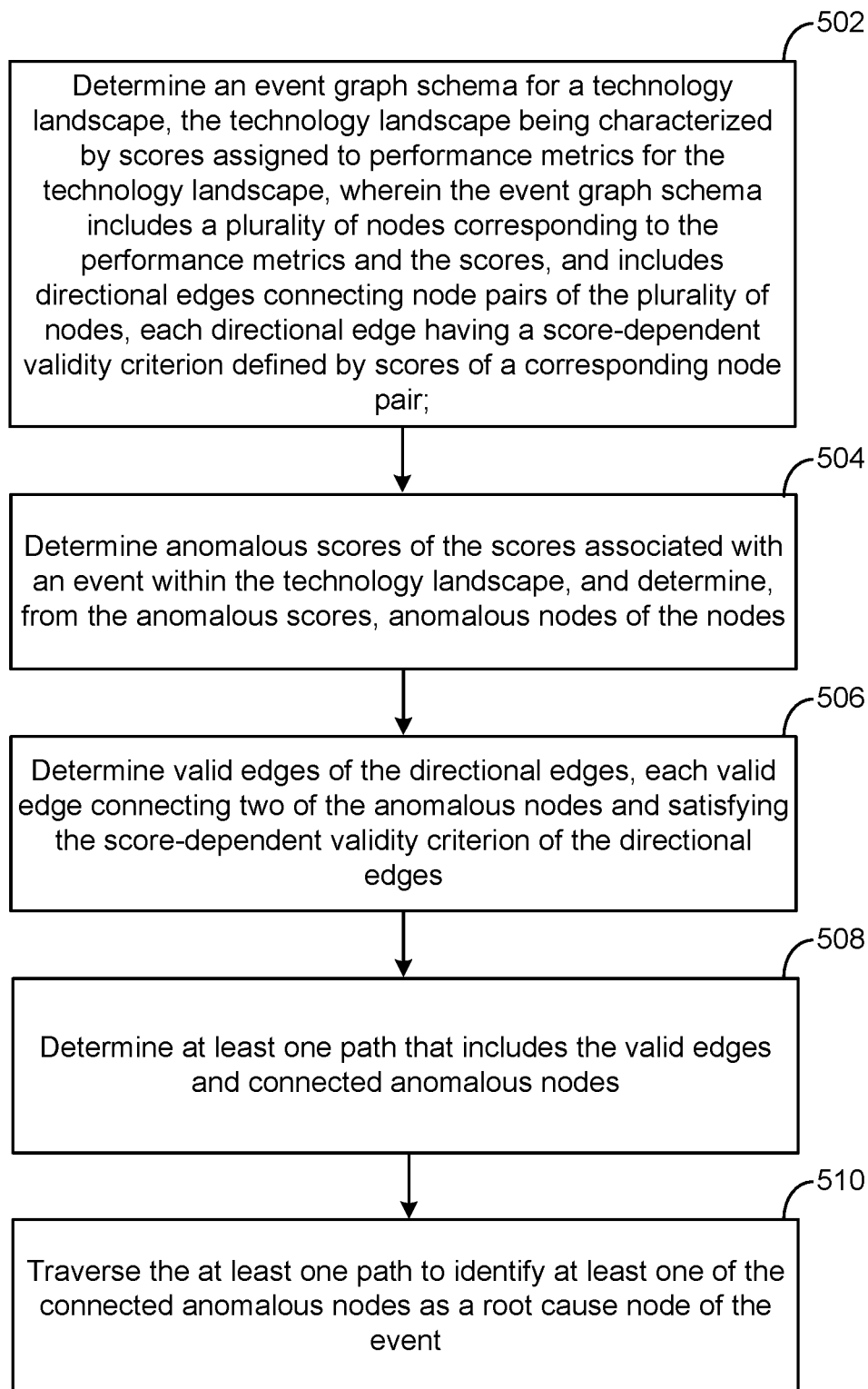
FIG. 5 is a flowchart illustrating example operations of the monitoring system of FIG. 1.

FIG. 5 is a flowchart illustrating example operations of the monitoring system 100 of FIG. 1. In the example of FIG. 5, operations 502 to 510 are illustrated as separate, sequential operations. In various implementations, the operations 502 to 510 may include sub-operations, may be performed in a different order, may include alternative or additional operations, or may omit one or more operations. Further, in all such implementations, included operations may be performed in an iterative, looped, nested, or branched fashion.

In FIG. 5, an event graph schema for a technology landscape may be determined (502). The technology landscape may be characterized by scores assigned to performance metrics for the technology landscape, and the event graph schema may include a plurality of nodes corresponding to the performance metrics and the scores, as well as directional edges connecting node pairs of the plurality of nodes, with each directional edge having a score-dependent validity criterion defined by scores of a corresponding node pair.

For example, the edge manager 120 may be configured as described above to construct the event graph schema 121 of FIG. 1 for the technology landscape 104 and associated performance metrics 106, in accordance with the simplified example of FIG. 2 and the more detailed example of FIG. 6, as discussed below. The event graph schema 121 may be constructed using cause-effect designations for nodes pairs and associated score-dependent validity criteria for directional edges connecting each node pair.

Anomalous scores may be determined from scores associated with an event within the technology landscape, and anomalous nodes may be determined from the anomalous scores (504). For example, the path generator 122 may receive scores generated by the score generator 114, using models of the model store 112 to score the performance metrics 106, as captured by the metric monitor 108. Scores may be designated as anomalous, including by providing a value and view of each anomalous score for each corresponding node. An event may refer to any occurrence related to a failure, malfunction, or other need for repair, maintenance, or upgrade. An event may be momentary (although with potentially long-lasting effects) or may have a sustained duration. An event may be related to a single resource or IT asset and associated performance metric, or may be related to potentially large numbers of resources and IT assets.

Valid edges of the directional edges may be determined, with each valid edge connecting two of the anomalous nodes and satisfying the score-dependent validity criterion of the directional edges (506). For example, the path generator 122 may evaluate attributes of each edge of the event graph schema 121 and each corresponding pair of nodes to determine a validity of an edge.

For example, in FIGS. 2 and 3, the path generator 122 may evaluate the edge 212 at a point in time, and for scores corresponding to FIG. 3. For example, the score-dependent validity criteria for edge 212 may require the nodes 202 and 204 to both have positive anomalous scores. Assuming for the example that this is not the case, FIG. 3 therefore shows no valid edge between nodes 302 and 304, even though both of the nodes 302 and 304 are illustrated as having anomalous scores. On the other hand, the score-dependent validity criteria for the edge 218 may similarly require both the nodes 202 and 210 to have positive anomalous scores for edge validity. Assuming for the example that this is the case, FIG. 3 therefore shows the valid edge 318 as being included. This process of edge evaluation may proceed until all edges in the event graph schema of FIG. 2 have been evaluated.

At least one path that includes the valid edges and connected anomalous nodes may thus be determined (508). For example, once the path generator 122 has evaluated all potential edges of the event graph schema of FIG. 2, path analysis may continue by identifying all node pairs with valid edges. In general, any valid edge (and associated node pair) may define a path. As described herein, unless a limit breach has been detected, a minimum path length may be set such that a minimum number of edges (and associated node pairs) may be required to establish a minimum path length.

Any edges or paths that exist within, or are a subset of, a longer path may be consolidated into the corresponding longer paths, and repetitive paths may be aggregated. For example, if a first path is included in its entirety in a second path, then the first path may be eliminated.

By way of specific example, for a time/scenario of: timestamp(GMT)=2020-05-17-14-21, category=Workload, KPIgroup=IRLM Requests, related categories=Workload, the following paths (1)-(4) may be determined for the following nodes and associated (scores):

(1) Db2 CPU Times for GP (−2.330426869)→DML (−3.339932489)

(2) Global Contention (3.357824935)→Page Block Activity (−3.699405002)→XES Requests (−2.147713015)→IRLM Requests (−2.901645661)

(3) Global Contention (3.357824935)→Page Block Activity (−3.699405002)→XES Requests (−2.147713015)→IRLM Requests (−2.901645661)

(4) IRLM CPU Times (2.936046278)→Global Contention (3.357824935)→Page Block Activity (−3.699405002)→XES Requests (−2.147713015)→IRLM Requests (−2.901645661)

As paths (2) and (3) are duplicative and included in path (4), paths (2) and (3) may be combined and eliminated.

The at least one path may be traversed to identify at least one of the connected anomalous nodes as a root cause node of the event (510). Any identified path may be traversed by identifying a path node having only an incoming or effect edge (e.g., a path end node, or last node), and traversing preceding nodes in a direction against the causal directions of incoming edges of the preceding nodes, until a node with no incoming or effect edge is reached (e.g., a path beginning node).

In specific examples, such a node may be designated as a root cause node. In other examples, such a node may be evaluated and be determined to be unlikely to be a root cause node, in which case the path navigator 123 may implement path inversion to follow the at least one path backwards in a direction of the valid path edges until a likely root cause node is reached. For example, a node having a negative score for (low) memory usage may be unlikely to be a root cause node, and path inversion may be implemented to proceed from such a node to a subsequent node in the path.

FIG. 6 is a more detailed example of a rendering of the event graph schema 121 of FIG. 2. FIG. 6 illustrates an example event graph schema 602 in a mainframe computing environment. Selector 604 enables selection of information related to the various nodes of the event graph schema 602, while selector 606 enables selection of information related to the relationships between such nodes. For example, the selector 604 may be chosen to view various node categories 608, which may be filtered using a filter 607. The selector 606 may be chosen to see relationships corresponding to the various edges between the nodes of the event graph schema 602, including the score-dependent validity criteria of each pair of nodes, as referenced above.

In the example of FIG. 6, the categories 608 include a CPU category 610, contention category 612, exception category 614, input/output (IO) category 616, real storage category 618, virtual storage category 620, workload category 622, and other category 624.

In general, the CPU category 610 may be related to activities and associated time spent using processors and related engines. The contention category 612 may be related to delays caused by competition for system resources. The exception category 614 may be related to KPI deviations that require immediate attention. The IO category 616 may be related to buffer read/write activities and data set open/close activities. The real storage category 618 may be related to physical storage availability and usage, while the virtual storage category 620 may be related to storage assigned to specific address spaces and shared storage usage, including working storage for user/system tasks. The workload category 622 may be related to an amount of work processed during a given interval, including thread management.

The above categories are merely examples, and many other categories and types of metrics may be used. Similarly, specific nodes within each category are merely by way of example. Metrics or types of metrics scored with respect to specific nodes, by themselves, may be known in the art and/or are self-explanatory, and/or may be explained in more detail below for purposes of explaining specific example use cases.

In FIG. 6, each node category 608 is illustrated with an identifier for identifying specific corresponding nodes of the event graph schema 602, and a number indicating a count of nodes within that category. For example, the contention category 612 is identified as including three contention nodes: a global contention node 612*a*, a local contention node 612*b*, and a page plock activity node 612*c* (where plock or p-lock refers to a specific type of page set or partition lock request).

Further in FIG. 6, and as described above with respect to FIG. 2, the event graph schema 602 includes many cause-effect relationships defined between pairs of nodes. For example, a relationship 626 defines an edge between the nodes 612b and 612a and illustrates that local contention can cause global contention. As referenced above, the relationship 626 may be defined and viewable using relationship selector 606, so that an appropriate score-dependent validity criterion may be provided for the relationship 626 to use in determining whether the relationship 626 should be included as an edge in a path during an event.

FIGS. 7 to 12 and FIGS. 14 to 20 illustrate example multi-dimensional graph renderings that may be used for probable cause analysis using the techniques described above. For example, FIGS. 7 to 12 and FIGS. 14 to 20 illustrate that scores are being generated during a time period or time periods referenced by the various illustrated timelines, are being generated e.g., every minute of a given day.

The resulting multi-dimensional graphs may be generated by traversing the instances of the graph control file of FIG. 6, using current score values. During such traversal, for example, all nodes having anomalous scores may be identified and examined. Any valid edges between node pairs may be included, resulting in identification of valid paths that include one, two, or more valid edges.

As referenced herein, an event may refer to a system failure, malfunction, or other occurrence that requires maintenance, repair, or other attention. Timelines of FIGS. 7 to 12 and FIGS. 14 to 20 may be used to show relevant times of an event (e.g., start, end). As described with respect to FIG. 1, it is desirable to understand the root causes of the event to support such remediation efforts, and it is desirable to classify each event to assist in predicting and preventing such events from re-occurring.

To perform root cause analysis, any node in an active path that does not have a cause relationship (i.e., has only an effect relationship) may be used as a starting point. One or more paths ending at that node may be traversed backwards (i.e., against the displayed arrow directions) in an inversion path to reach a root cause node.

In some examples, as also described, path inversion may be used to identify a root cause node. For example, if the above technique is used to identify a first node in a path, but that node has a negative score vale, then the traversal may continue back up in a forward direction of the arrows until a node with a positive score value is reached. If no such positive score value is reached, then the original root node may be used. This path inversion technique reflects the unlikelihood that a negative anomalous score will be a root cause of an event, since such scores may be associated with a lack of a resource or system occurrence (e.g., a lack of network traffic) rather than a malfunction per se.

Figure 7:
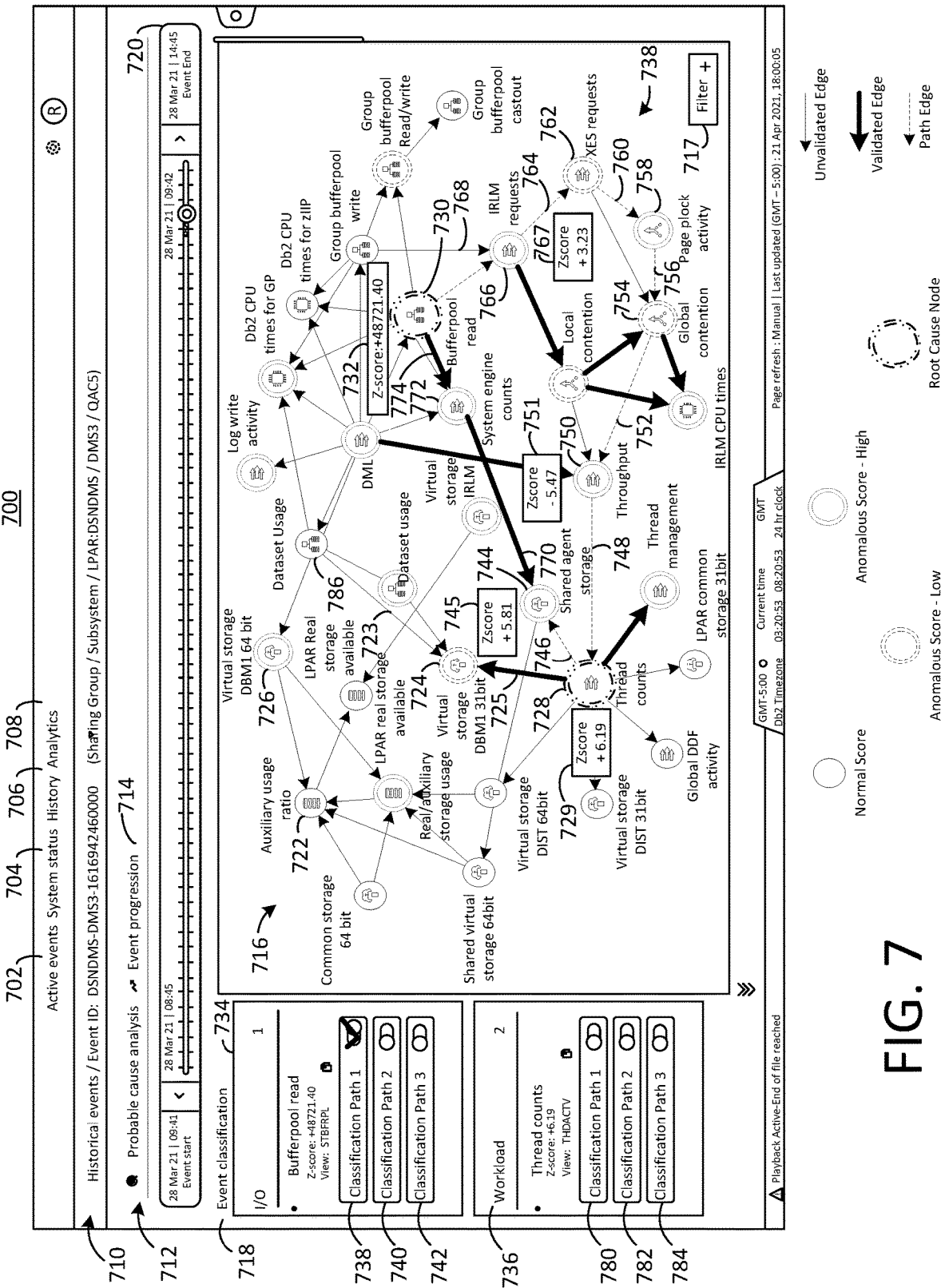
FIG. 7 is a first screenshot illustrating a first event and associated paths at a first time.

FIG. 7 is a first screenshot 700 illustrating a first event and associated paths at a first time. In the screenshot 700, a user may select one of active events 702, system status 704, history 706, or analytics 708. In FIG. 7, an example is illustrated in which history 706 is selected.

Consequently, event identification is provided in line 710. As shown, the line 710 provides an event identifier (ID), which may provide various characteristics related to the event, such as a group, subsystem, or logical partition (LPAR) associated with the event.

Also in FIG. 7, it is possible to select probable cause analysis 712 or event progression 714. As shown in the example, probable cause analysis 712 is selected and demonstrates examples of the various techniques described above with respect to FIGS. 1 to 6. Event progression 714 may be selected to show an illustration of the identified event developing over a defined time period.

Event graph instance 716 represents an instance of the event graph schema 602 of FIG. 6, reflecting current scores and corresponding validated edges and paths of the various nodes and relationships (edges) of FIG. 6. Event classification 718 provides specific identified paths and associated root cause nodes, as referenced above and described in detail, below.

A timeline 720 provides a start time for the identified event (shown in the example of FIG. 7 as Mar. 28, 2021, at 09:41), and an end time for the identified event (shown in the example of FIG. 7 as Mar. 28, 2021, at 14:45). The specific time corresponding to the graph 716 is illustrated on the timeline 720 as Mar. 28, 2021, at 09:42.

The event graph instance 716 illustrates the various features described above with respect to FIGS. 1 to 6. For example, the various nodes may be highlighted using different colors or other indicators to indicate information regarding a current score status of each node. For example, nodes may be colored green, yellow, or red to correspond to the various example scoring ranges described above.

FIG. 7 includes a legend that indicates drafting conventions used with respect to the various nodes in all of FIGS. 7 to 12 and 14 to 20, in which the illustrated line patterns of the nodes demonstrate a normal score, a low anomalous score, a high anomalous score, and a root cause node. As the legend further illustrates, unvalidated edges are demonstrated as arrows, validates edges are illustrated as bolded arrows, and path edges (i.e., validated edges included in paths) are illustrated using dashed lines.

In FIG. 7, the node 722 for auxiliary usage ratio is illustrated as an example of nodes having a green or normal score status (i.e., an expected or non-anomalous score status). In example implementations, such nodes may be greyed out, non-selectable, colored green, or removed entirely from the event graph instance 716. As also illustrated, the various edges representing potential causal relationships connected to such nodes may similarly be greyed out, non-selectable, or removed entirely. For example, a filter 717 may be used to filter out nodes having normal scores, or otherwise modify the display of the event graph instance 716 in a desired manner.

A node 724 for virtual storage DBM1 (31 bit) is illustrated as an example of nodes having a yellow or cautionary score status. As illustrated, and discussed in detail, below, such nodes may have one or more edges, which may or may not be validated as a result of an evaluation of the pair-wise score-dependent validity criteria and score pairs of the node pairs of each edge. That is, for the example of the node 724, an edge 723 is not validated (and may thus be greyed out or removed), while an edge 725 is validated. For example, the edge 725 may be validated based on evaluation of scores of the node 724 and a connected node 728 for thread counts (i.e., the corresponding node pair). As illustrated in FIG. 7 and described in detail below, such validated edges may be colored or otherwise highlighted as visual indications to demonstrate a valid edge status or to convey other desired information.

A node 726 for virtual storage DBM1 (64 bit) is illustrated as an example of nodes having a red or anomalous score. However, no incoming or outgoing edges have been validated for inclusion in the example, due to the lack of validating score pairs between the node 726 and any connected nodes.

The node 728 for thread counts and a node 730 for bufferpool read operations are illustrated as a fourth node category, referred to herein as root cause nodes of one or more valid paths. The node 728 further illustrates that a score 729 (illustrated as z-score +6.19) of a selected node may be displayed adjacent thereto, or otherwise as desired, within the event graph instance 716. Similarly, the node 730 illustrates a score 732 (illustrated as z-score +48721.40) displayed adjacent thereto, as well.

Within the event classification 718, more detailed and specific event classifications may be listed by category type (e.g. using the categories 608 of FIG. 6). For example, an IO event classification 734 and a workload event classification 736 are illustrated in FIG. 7. The IO event classification 734 identifies the node 730 (bufferpool read) and associated z-score (+48721.4) as a root cause node of the ongoing event, and provides a link to a more detailed view of information regarding the node 730 and related event information (shown as view: STBFRPL). Similarly, the workload classification 736 identifies the node 728 (thread counts) and associated z-score (+6.19) as a second root cause node of the ongoing event and provides a link to a more detailed view of information regarding the node 728 and related event information (shown as view: THDACTV).

Further within the IO event classification 734, individual, validated classification paths 738, 740, and 742 are illustrated. That is, the classification paths 738, 740, 742 represent all identified paths of validated edges for which the node 728 has been identified as a root cause node, using the techniques of FIGS. 1 to 6. As also shown, the classification paths 738, 740, and 742 are selectable to enable a user to individually view specific ones of the classification paths 738, 740, and 742 within the event graph instance 716.

In FIG. 7, the classification path 738 is selected, causing the corresponding nodes and/or validated edges of that path to be highlighted or otherwise visually indicated within the event graph instance 716 (shown as dashed lines in FIG. 7, in accordance with the legend of FIG. 7). Specifically, the classification path 738 is illustrated as including a node 744 (shared agent storage), edge 746, the node 728 (thread counts), edge 748, a node 750 (throughput), edge 752, a node 754 (global contention), edge 756, a node 758 (page plock activity), edge 760, a node 762 (XES requests), edge 764, a node 766 (IRLM requests), edge 768, and finally the node 730 (bufferpool read) as the root cause node. In FIG. 7, the validated path edges 746, 748, 752, 756, 760, 764, and 768 are indicated as dashed lines. The node 744 (shared agent storage) is illustrated with an example z-score 745 of +5.81, the node 750 (throughput) is shown with a z-score 751 of −5.47, and the node 766 (IRLM requests) is shown with a z-score 767 of +3.23.

Other paths with the same or different root cause node(s) may be identified. For example, a path with the node 744 (shared agent storage), a validated edge 770, a node 772 (system engine counts), and a validated edge 774 may define a second path with the node 730 as a root case node.

Meanwhile, the workload event classification 736 may also include multiple classification paths 780, 782, and 784, all having the node 728 (thread counts) as a root cause node. For example, a path may include the node 724 (virtual storage DM1 (31 bit)), the validated edge 725, and the node 728 (thread counts) as the root cause node.

Events may be related to an underlying occurrence or use of the system being monitored. In the example of FIG. 7, it may occur that a poorly designed or implemented access path (or access path batch) for accessing data may cause excess bufferpool reads, which may slow down an overall process that utilizes the access path(s) in question. To account for this process slowing, additional thread counts may be added, potentially leading to excess thread counts. Many repercussions may flow from such a sequence of events, such as anomalous scores in thread management, or, as described below with respect to FIGS. 8 and 9, anomalous scores in the categories of local or global contention.

In existing systems, all such anomalous scores may be provided at once at a given time. Moreover, additional anomalous scores for nodes unrelated to the access path problem may be provided at the same time, and such additional anomalous scores may be related to a different event, and/or may be transient anomalies that do not require action or correction. Consequently, in such existing systems, it may be very difficult to discern what events are occurring, whether anomalous scores are false positives, and/or what action should be taken.

In contrast, the example of FIG. 7 illustrates that the thread count node 728 and the bufferpool read node 730 are root cause nodes of a related event with multiple repercussions. A user may determine that attention should be paid to the nodes 728 and 730, and may more quickly determine that a bad access path batch should be corrected to end the event.

Moreover, the event classification 718 quantifies and memorializes a relevant pattern of node anomalies and related paths associated with the event in question and does so over a period of time as the anomalies and paths develop. Consequently, as described above with respect to the event classifier 124, it becomes possible to store the relevant event classification data as labelled training data, for use in providing supervised ML techniques to construct corresponding ML models for predicting future events and identifying corrective actions before, or much earlier during, a future event.

Figure 8:
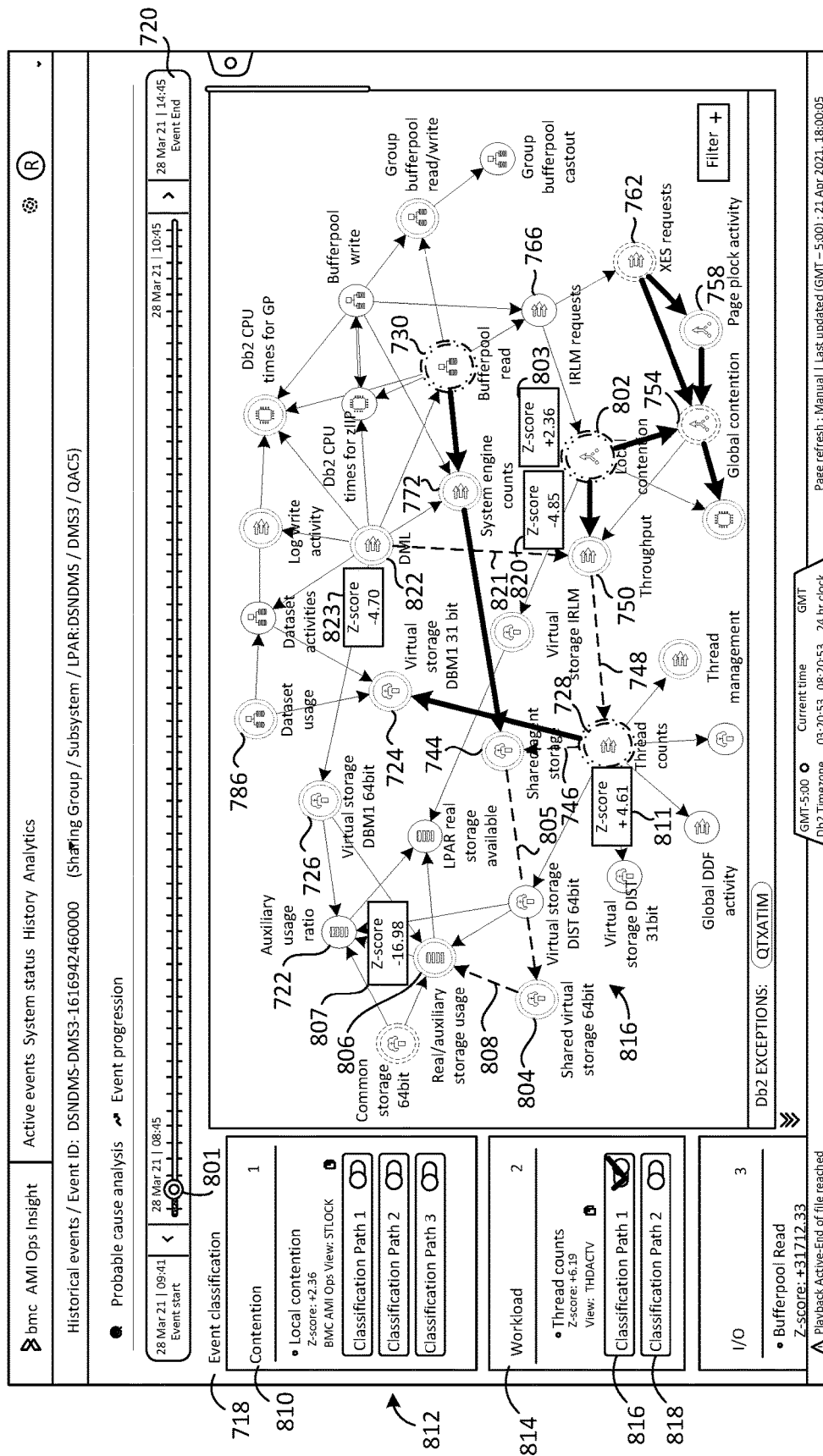
FIG. 8 is a second screenshot illustrating the first event of FIG. 7 and associated paths at a second time.

For example, FIG. 8 is a second screenshot illustrating the event of FIG. 7 and associated paths at a second time 801 (e.g., Mar. 28, 2021 at 09:46) of the timeline 720. In FIG. 8, a scenario is illustrated in which the excess thread counts of FIG. 7, which may be added automatically to address the excess bufferpool read operations and associated throughput slowdowns, in turn lead to high contention levels.

For example, FIG. 8 illustrates a node 802 (local contention) as a root cause node having a z-score 803 of +2.36. A corresponding event classification 810 (contention) identifies the node 802 (local contention), with z-score +2.36 a root cause node and identifies various associated classification paths 812, none of which are selected for highlighting in the example of FIG. 8.

A workload event classification 814 similarly identifies the thread counts node 728 as a root cause node. Corresponding classification paths 816 and 818 are illustrated, with classification path 816 being selected for highlighting.

As shown, the classification path 816 includes a node 806 (real/auxiliary storage usage) with a z-score 807 of −16.98 connected by a validated edge 808 to a node 804 (shared virtual storage 64 bit), which is connected by an edge 805 to the node 744, which is connected by the validated edge 746 to the node 728 (thread counts), which is shown in FIG. 8 as having a z-score 811 of +4.61. The node 728 (thread counts) is connected by validated edge 748 to the node 750 (throughput) (shown as having a z-score 820 of −4.85, which is connected to a node 822 (DML, which is data manipulation language requests) by a validated edge 821, with the node 822 (DML) having an illustrated z-score 823 of −4.70.

Thus, FIG. 8 illustrates an example of path inversion to determine the node 728 (thread counts) as a root cause node. Specifically, following the path 816 from effect nodes to cause nodes (i.e., starting from the node 806 and working against a direction of the various validated edges 808, 805, 746, 748, and 821) leads to the node 822. However, the node 822 (DML) has a negative z-score 823 of −4.70. Following the validated edge 821 back to the node 750 (throughput) similarly shows a negative z-score 820 of −4.85. The nodes 822 (DML) and 750 (throughput) are thus unlikely to be root causes of an event, because the negative z-score 823 of the node 822 (DML) reflects a lack or shortage of DML requests, and the negative z-score 820 of the node 750 (throughput) reflects a lower-than-expected throughput of −4.85.

Following the validated edge 748 from node 750 (throughput) to the node 728 (thread counts), however, shows a positive z-score 811 of +4.61, indicating an excess thread count, which may in fact lead to additional downstream problems, such as, for example, problems with shared agent storage as reflected by abnormal z-scores for the node 744 (shared agent storage, values of which are not shown in FIG. 8). Thus, the node 728 is designated as the root cause node of selected classification path 816.

Figure 9:
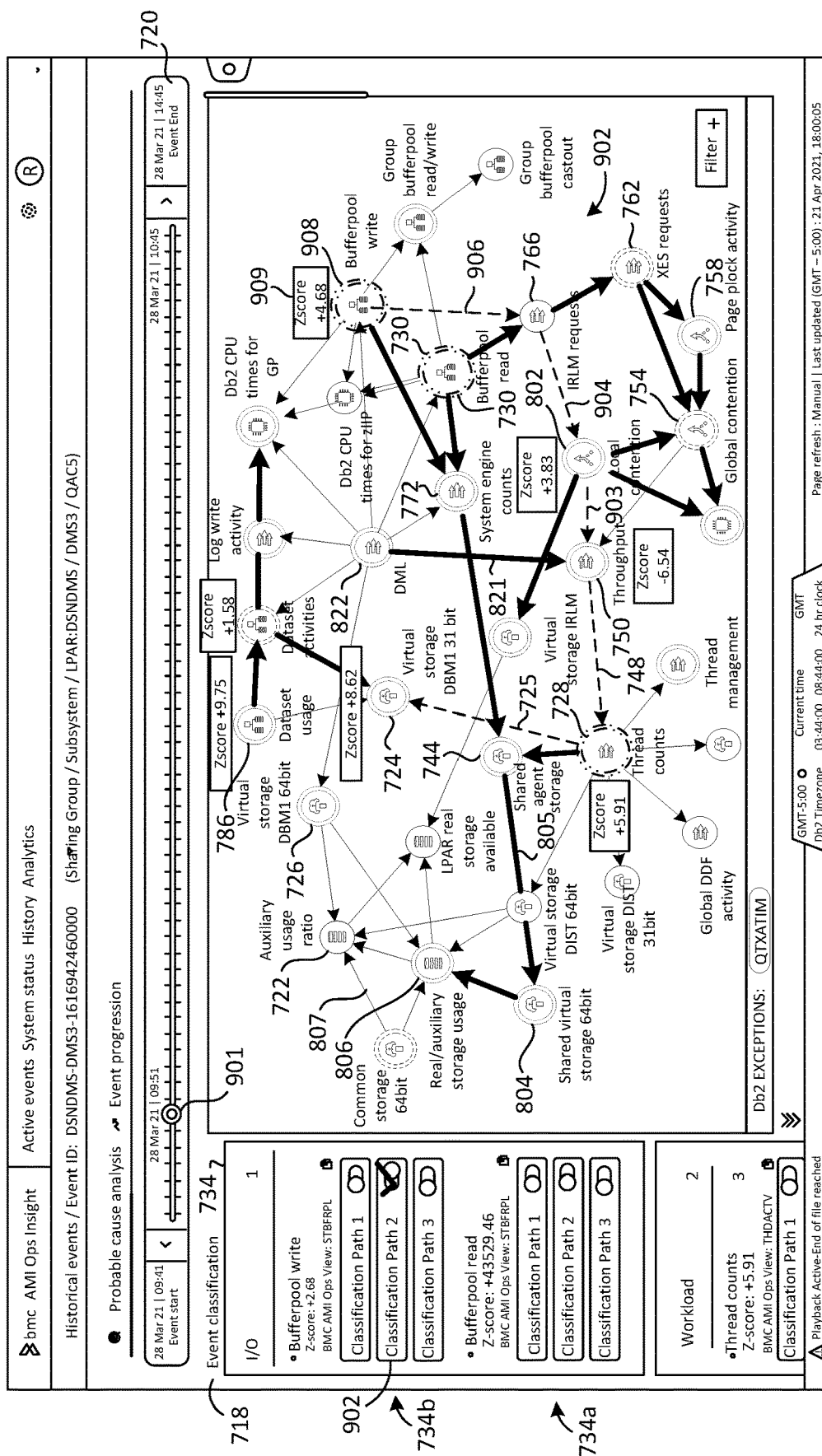
FIG. 9 is a third screenshot illustrating the first event of FIG. 7 and associated paths at a third time.

FIG. 9 is a third screenshot illustrating the event of FIG. 7 and associated paths at a third time 901 (e.g., Mar. 28, 2021 at 09:51). In FIG. 9, the IO event classification 734 includes the bufferpool read event classification 734a and a bufferpool write event classification 734b.

A classification path 902 of the bufferpool write event classification 734b is selected for viewing. The classification path 902 includes the node 724 (virtual storage DBM1 31 bit), connected by the validated edge 725 to the node 728 (thread counts), which is connected by the validated edge 748 to the node 750 (throughput), which is connected by a validated edge 903 to the node 802 (local contention). The node 802 (local contention) is connected by a validated edge 904 to the node 766 (IRLM requests), which is connected by a validated edge 906 to the node 908 (bufferpool write) that is the root cause node of the IO classification path 902, shown in FIG. 9 as having a z-score 909 of +4.68.

Thus, the added thread counts of FIG. 8 lead to more contention, which results in the additional bufferpool read and write operations of FIG. 9, which lead to yet more thread counts being added, with further unwanted levels of contention. Such examples illustrate that problems and anomalies may spiral out of control in a feedback loop that may ultimately result in a system freeze, malfunction, crash, failure, or various other unwanted outcomes.

In the examples of FIGS. 7-9, however, the various root cause nodes may be quickly and accurately identified early in and throughout the process of such feedback loops. Moreover, as such feedback loops develop and progress, the data of FIGS. 7-9, including all scores, paths, and/or associated classifications, may be stored as labelled training data, and used by the event classifier 124 of FIG. 1 to train and execute supervised ML algorithms. Over time and over multiple instances of various events occurring, the event classifier 124 may thus become more and more trained and capable of identifying the most important paths, root cause nodes, and anomalous scores that are most likely to lead to undesired outcomes, and also trained and thus more capable of ignoring paths, nodes, and scores that do not and will not lead to undesired outcomes (e.g., avoiding false positive results).

Such advantages may be obtained without experiencing, or at least minimizing, actual system freezes, malfunctions, crashes, failures, or other undesired outcomes. Moreover, the training may be performed with a high volume of training data that is particularized to individual systems (e.g., customers), so that the event classifier 124 may provide fast, specific, and efficient predictions.

Additionally, as may be observed with respect to FIGS. 6-10, specific positions (e.g., coordinates) of individual nodes, or groups of nodes, may dynamically and automatically change or adjust over time, in order for system administrators or other users to more easily view identified paths or other aspects of the screenshots of FIGS. 6-9.

For example, the event graph schema 602 of FIG. 6 shows the various illustrated nodes in a default position. In this example, the nodes may be positioned to minimize an average length of the edges and/or to cluster members of the node categories 608.

Through the progress of the examples of FIGS. 7 to 9, the various nodes may be positioned according to a similar or different positioning algorithm(s) than used in FIG. 6. As a result, relative positions of various nodes may change automatically with the passage of time as shown by the timeline 720 of FIGS. 7 through 11, or may be repositioned in response to user selections, and/or in response to updated scores being received, among other examples. As an example of a change in relative position, the node 786 (dataset usage) of FIGS. 7-9 is not identified as being part of any illustrated or highlighted paths. The node 786 (dataset usage) is initially located somewhat centrally within the event graph instance 716 and in a general vicinity of the root cause nodes 728 (thread counts) and 730 (bufferpool read), but may be observed to be moved to a periphery of the screenshots of FIGS. 8 and 9.

To implement the above and related functionality, the path manager 102 of FIG. 1 may instruct the GUI generator 118, for example, to generate the event graph instance 716 to localize or cluster nodes of identified paths. The various nodes may be repositioned in response to the selection of the classification path 738 in order to more easily highlight or visualize the classification path 738. In other examples, the positioning algorithm may position nodes to minimize a total path length of an identified path.

Figure 10:
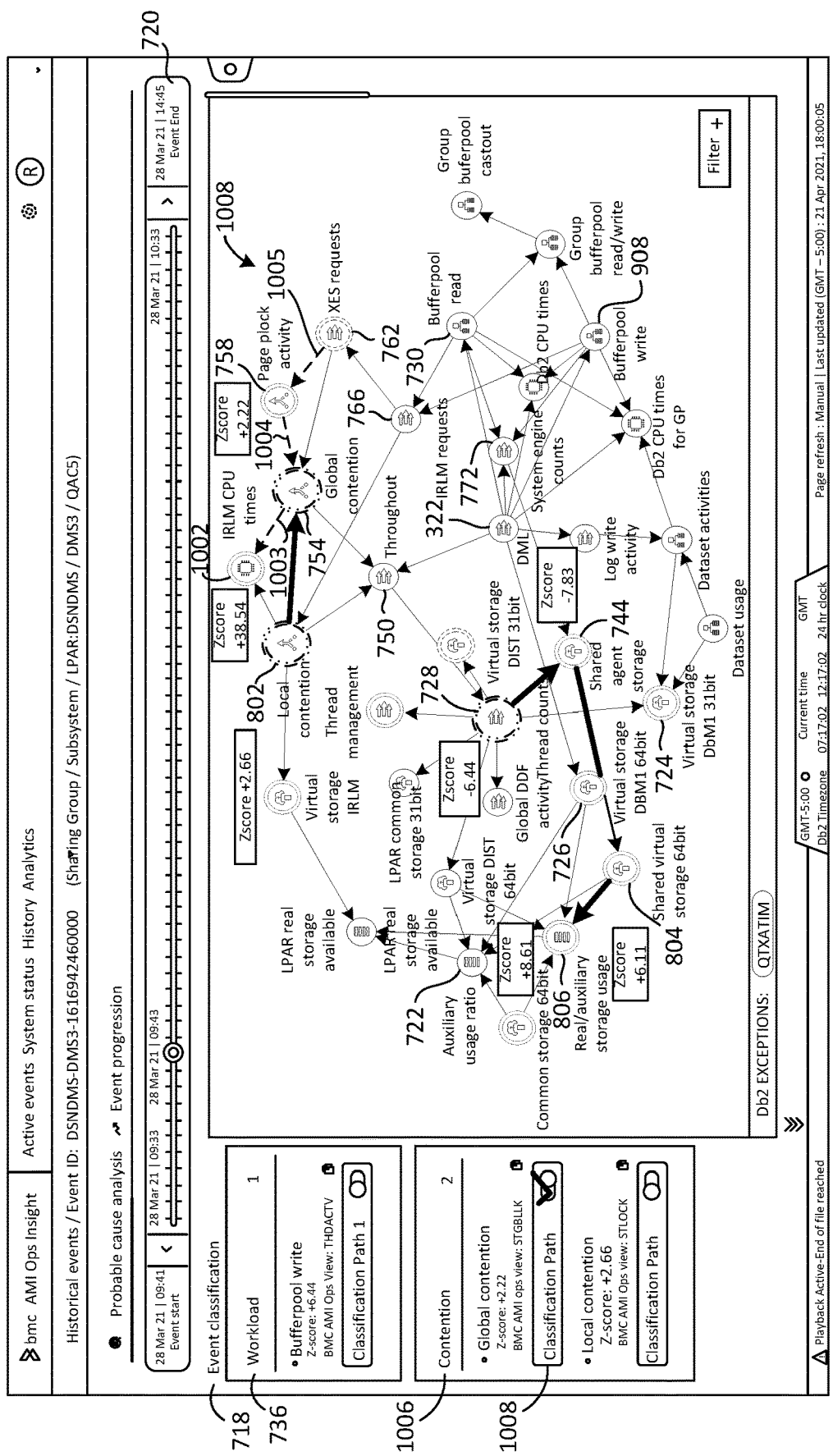
FIG. 10 is a first screenshot illustrating a second event and associated paths.
Figure 11:
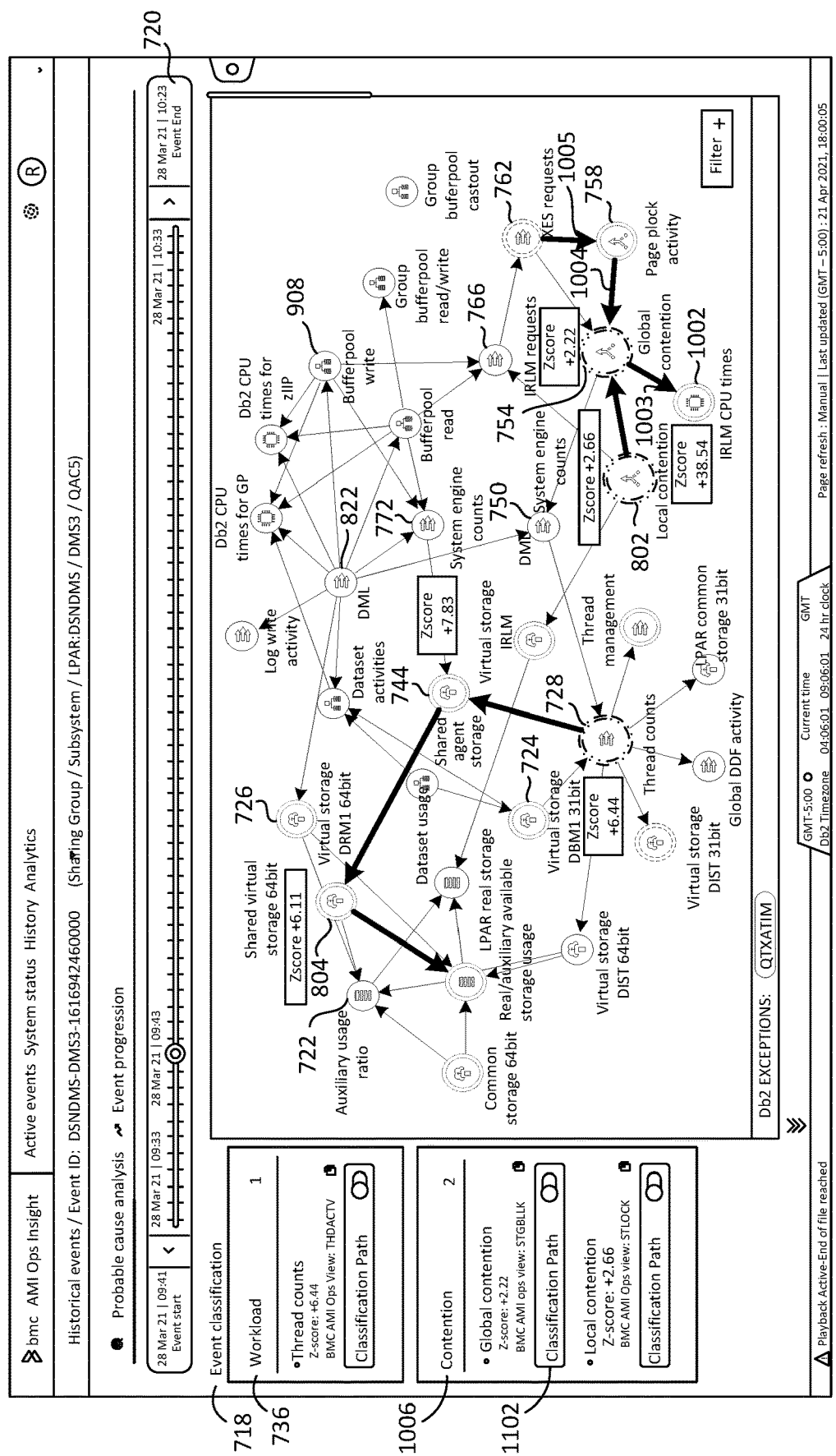
FIG. 11 is a second screenshot illustrating the second event of FIG. 10 and associated paths, with different user path selections.

Operations of the path manager 102 in executing such positioning algorithms are illustrated in further detail with respect to the examples of FIGS. 10 and 11. Specifically, FIG. 10 is a first screenshot illustrating a second event and associated paths. FIG. 11 is a second screenshot illustrating the event of FIG. 10 and associated paths, with different user path selections.

In FIG. 10, the node 754 (global contention) is a root cause node within a selected classification path 1008 of contention event classification 1006. As shown, the selected path includes a node 1002 (IRLM CPU times), validated path edge 1003, the node 754 (global contention), validated path edge 1004, the node 758 (page plock activity), validated path edge 1005, and the node 762 (XES requests) (with the validated path edge 1005 shown as dashed lines).

As may be observed from the timeline 720 in FIGS. 10 and 11, FIG. 11 illustrates the same event, at the same time (Mar. 28, 2021 at 9:43) as the example of FIG. 10. However, in FIG. 11, the classification path 1008 is no longer selected for highlighting, as indicated by the non-selected classification path indicator 1102 of FIG. 11.

As a result, no individual path in FIG. 11 is separately highlighted (e.g., with dashed lines). Further, although FIG. 11 otherwise contains the same information as FIG. 10, FIG. 11 illustrates that the positioning algorithm referenced above may be executed in response to the non-selection (1102) of the classification path 1008 of FIG. 10. For example, in FIG. 10, the node 754 (global contention) is located at a top of the illustrated screenshot, while in FIG. 11, the node 754 (global contention) is illustrated in a bottom, right corner of the illustrated screenshot. Moreover, many or all of the contention-related nodes included in the illustrated paths (e.g., the nodes 802 (local contention), 754 (global contention), 1002 (IRLM CPU times), 758 (page plock activity), and 762 (XES requests)) are moved together, and the various edges labelled in FIG. 10 (e.g., 1003, 1004, and 1005) are correspondingly minimized.

As may be observed, the positioning algorithm may be executed in response to a user action or selection. The positioning algorithm may be executed in response to a progression of time, including in response to score changes determined by the score generator 114 of FIG. 1. The positioning algorithm may be executed in response to changes to edges, paths, and/or root cause nodes, as determined by the path manager 102. The positioning algorithm may be executed in response to various other factors, such as limit breach warnings, as described below.

Figure 12:
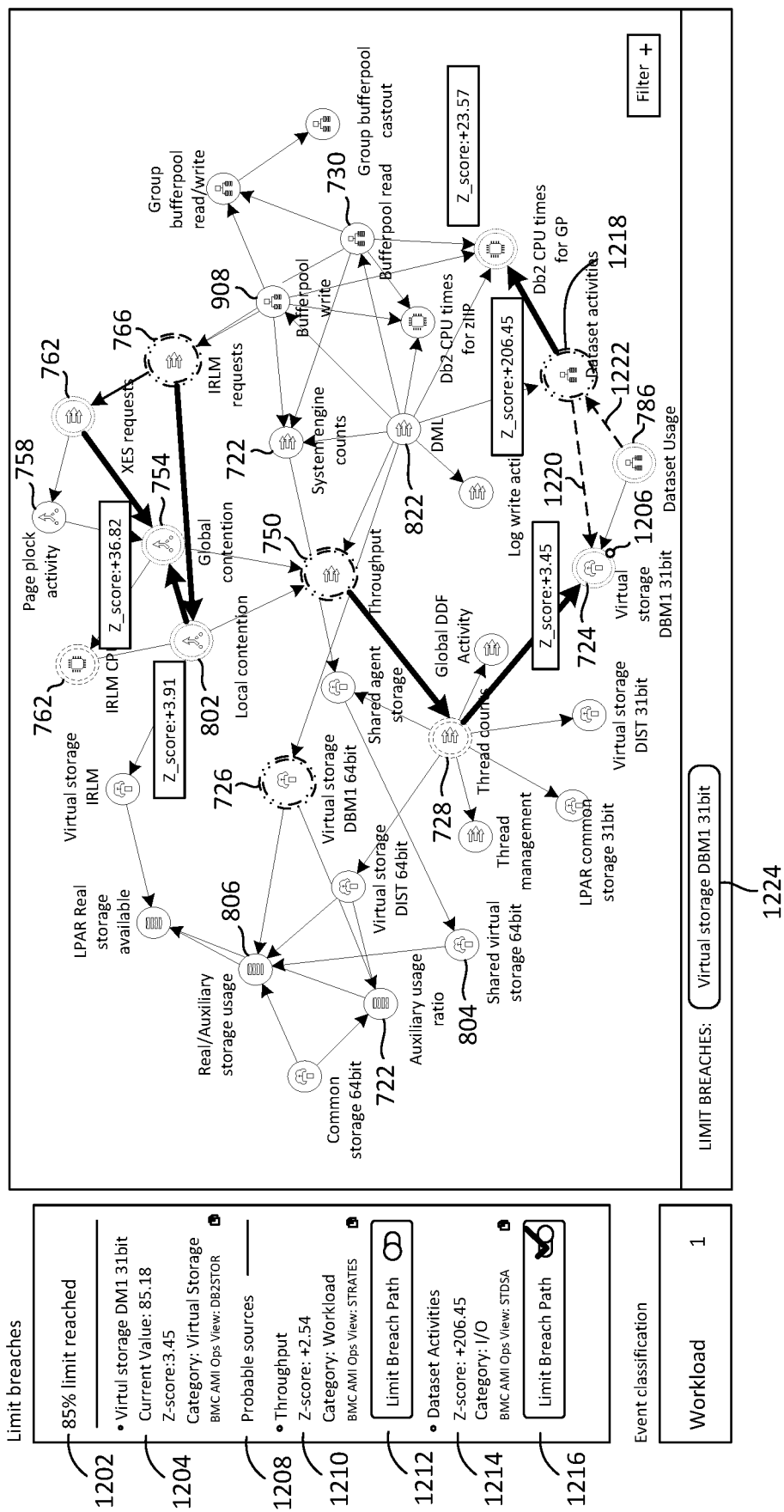
FIG. 12 is a screenshot illustrating a limit breach warning.

For example, FIG. 12 is a screenshot illustrating a limit breach warning. As described above, limit breach warnings refer to scenarios in which one or more node scores, and/or values of underlying performance metrics, exceed some predefined threshold.

In the example of FIG. 12, a limit breach window 1202 indicates that an 85% limit threshold has been reached for the node 724 (virtual storage DBM1 31 bit), which is reflected with identifying information in a section 1204 (including a current value (85.18) as well as a current z-score (+3.45)). The limit breach is further indicated by a limit breach indicator 1206 displayed in conjunction with the node 724 (virtual storage DBM1 31 bit). In the example of FIG. 12, the limit breach indicator 1206 is shown as a dot on a perimeter or periphery of the node 724. For example, the limit breach indicator 1206 may dynamically rotate around the perimeter of the node 724. Many other visual indicators, for example, limit breach indicator 1224, may be used to indicate such limit breaches and their associations with specific nodes.

Further in FIG. 12, a section 1208 indicates probable sources of the limit breach using techniques described herein. As shown, a section 1210 identifies the throughput node 750 as one root cause node, which includes a limit breach path 1212.

A section 1214 further identifies a node 1218 (dataset activities) as a potential root cause node. Again, a corresponding limit breach path 1216 is identified. In the example, the limit breach path 1216 is selected for viewing. As a result, validated path edges 1220 and 1222 are highlighted to identify and distinguish the limit breach path 1216 as including the nodes 724 virtual storage DBM1 31 bit), 1218 (dataset activities), and 786 (dataset usage), as well as the validated edges 1220 and 1222. Limit breaches may further be indicated in additional or alternative areas of the display, such as the additional limit breach identifier 1224 in FIG. 12.

In FIG. 12, the limit breach node 724 (virtual storage DBM1 31 bit) is not a root cause node. In other examples, however, a limit breach node may also be a root cause node. In such cases, the limit breach indicator 1206 may be displayed together with the colorization or other visual indicator used to identify a root cause node, as illustrated and described herein.

Figure 13:
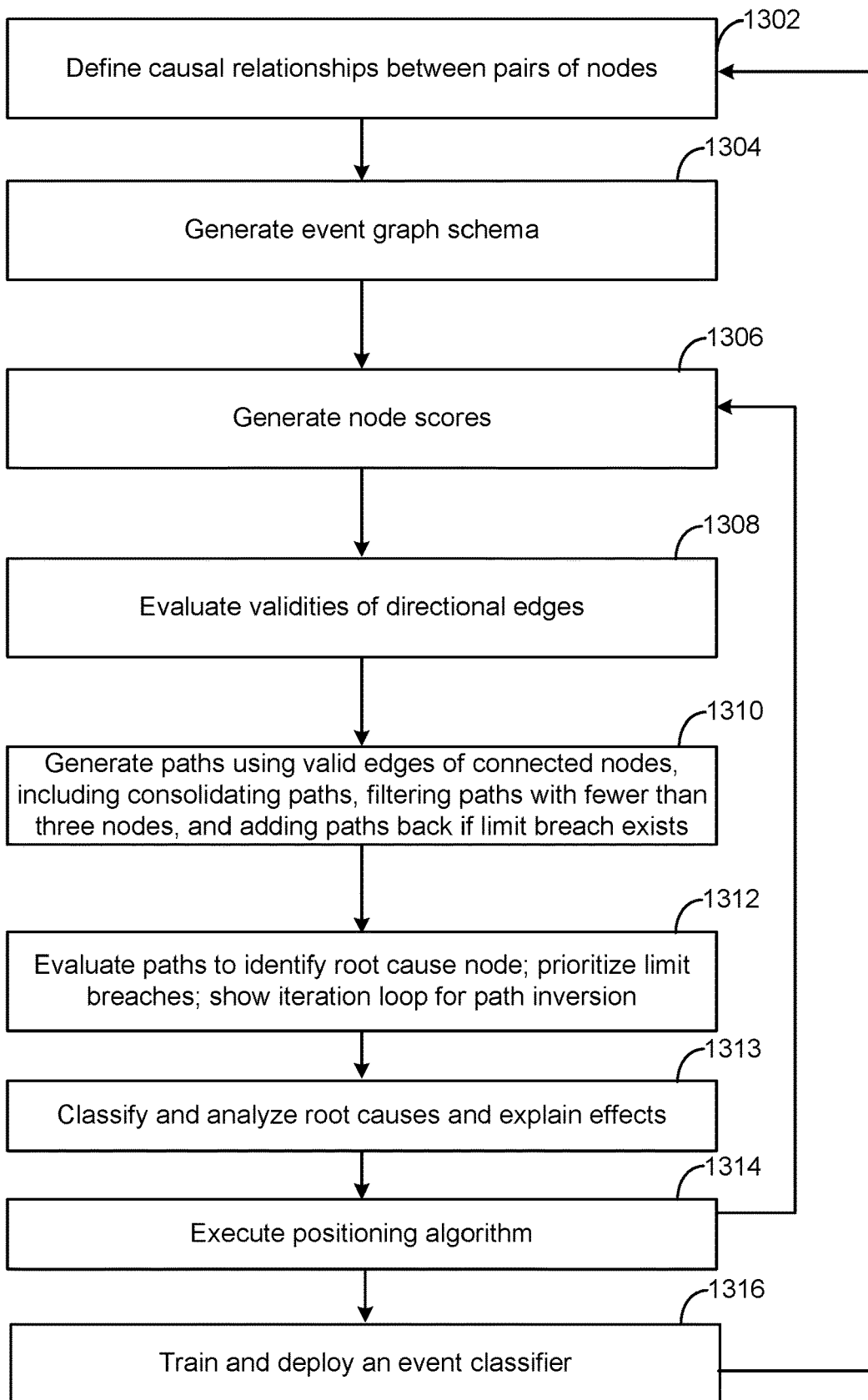
FIG. 13 is a flowchart illustrating example operations of the monitoring system of FIG. 1 for FIGS. 6-12.
Figure 14:
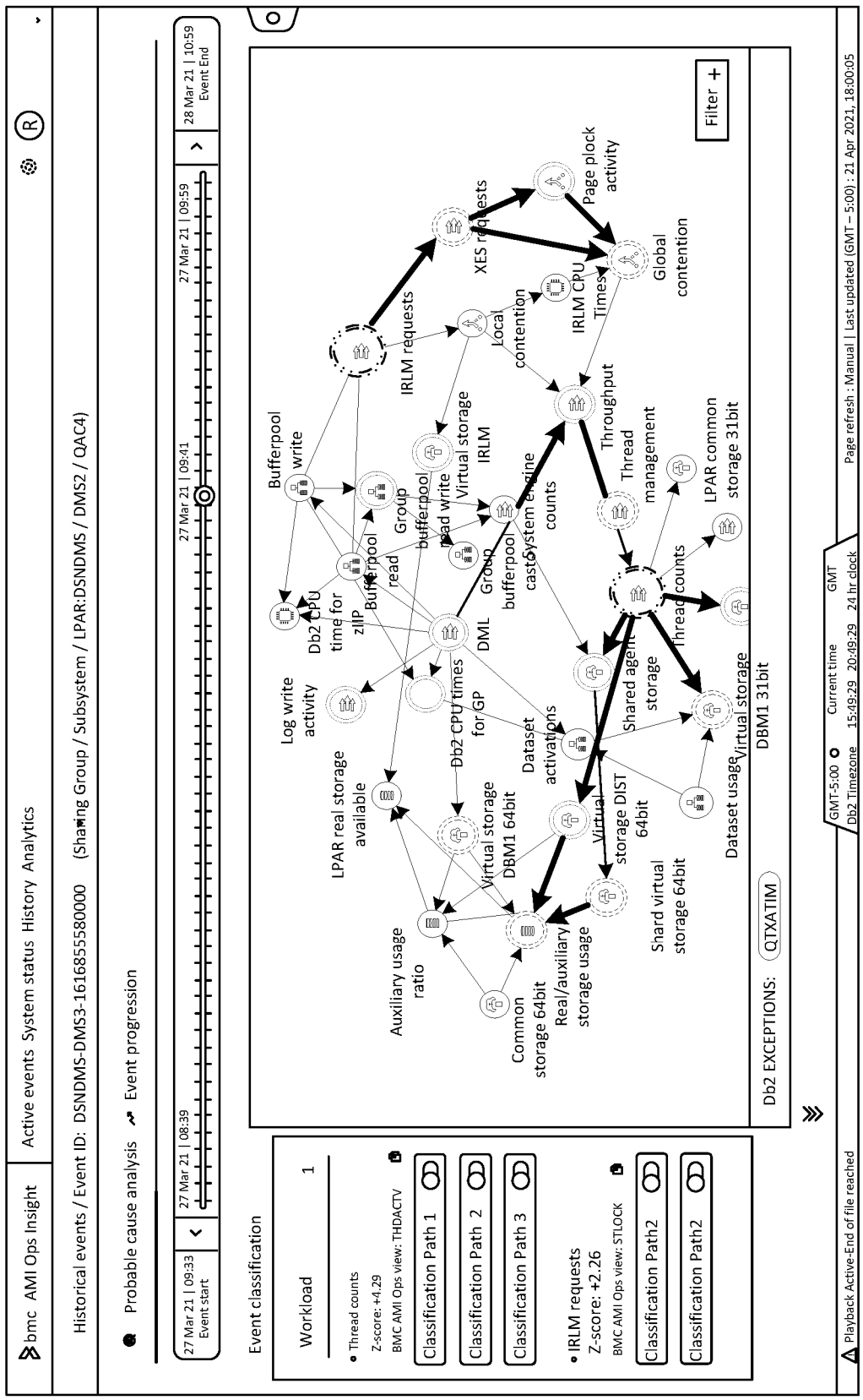
FIGS. 14-20 are additional screenshots illustrating further example implementations of the system of FIG. 1.
Figure 15:
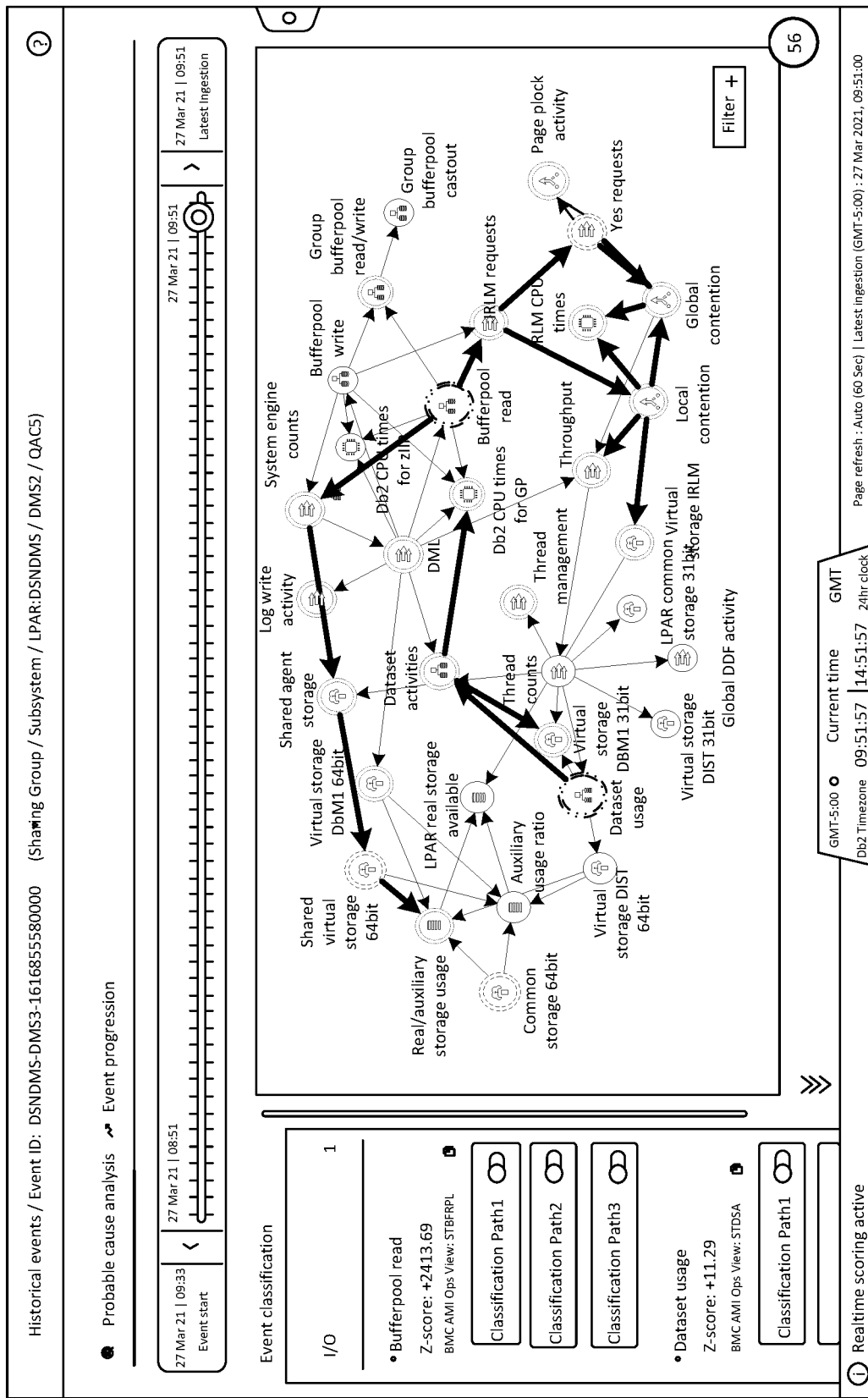
Figure 16:
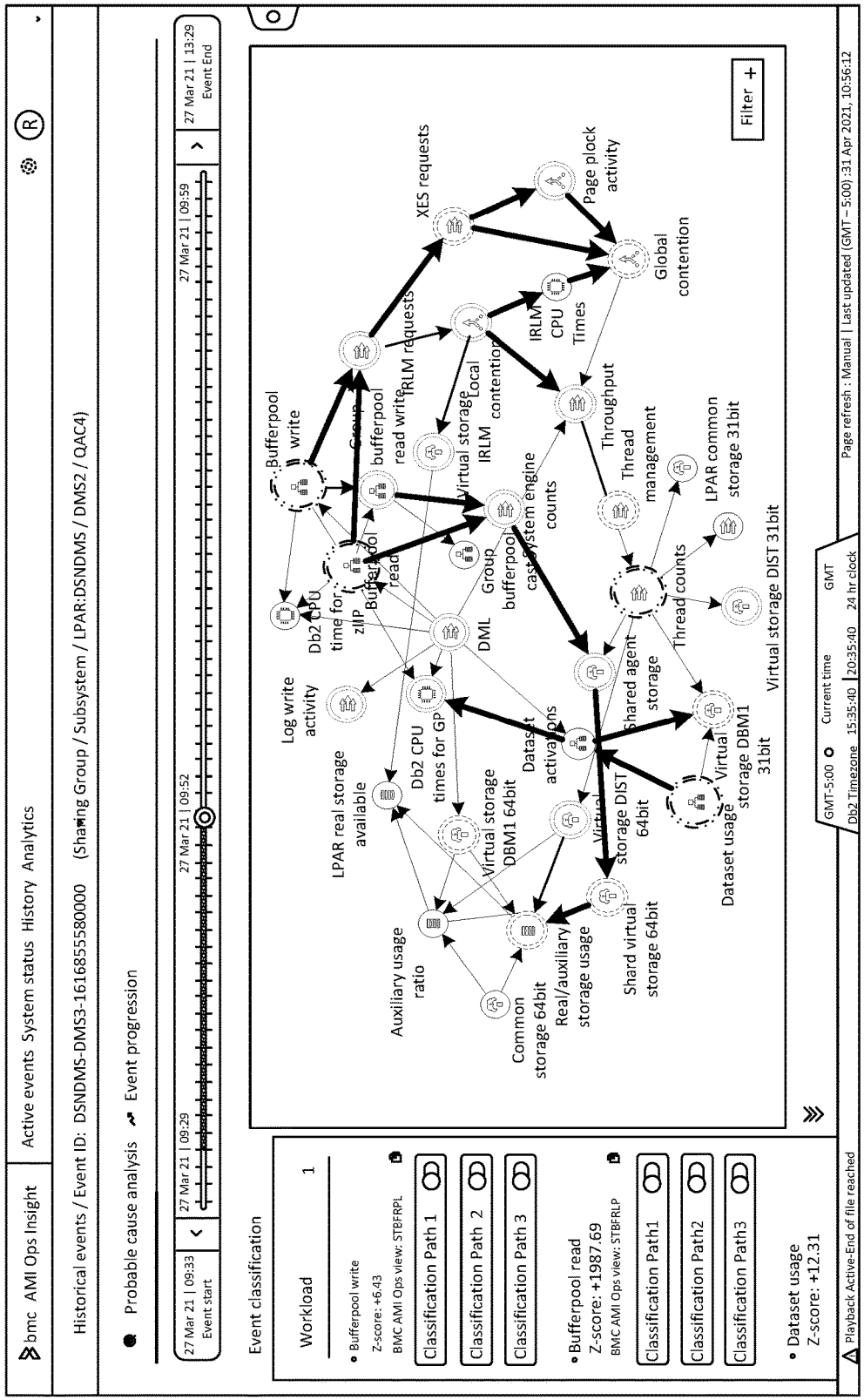
Figure 17:
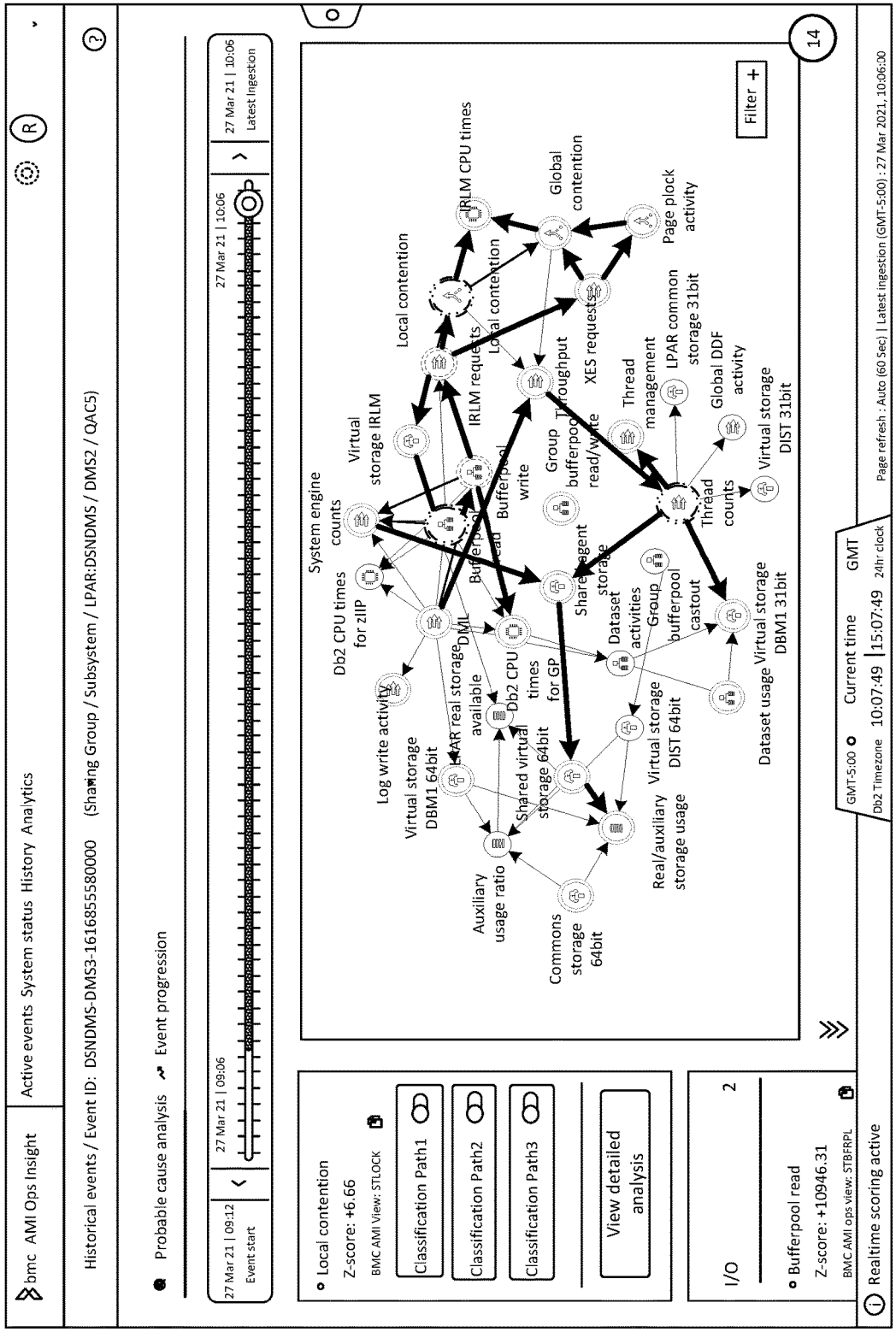
Figure 18:
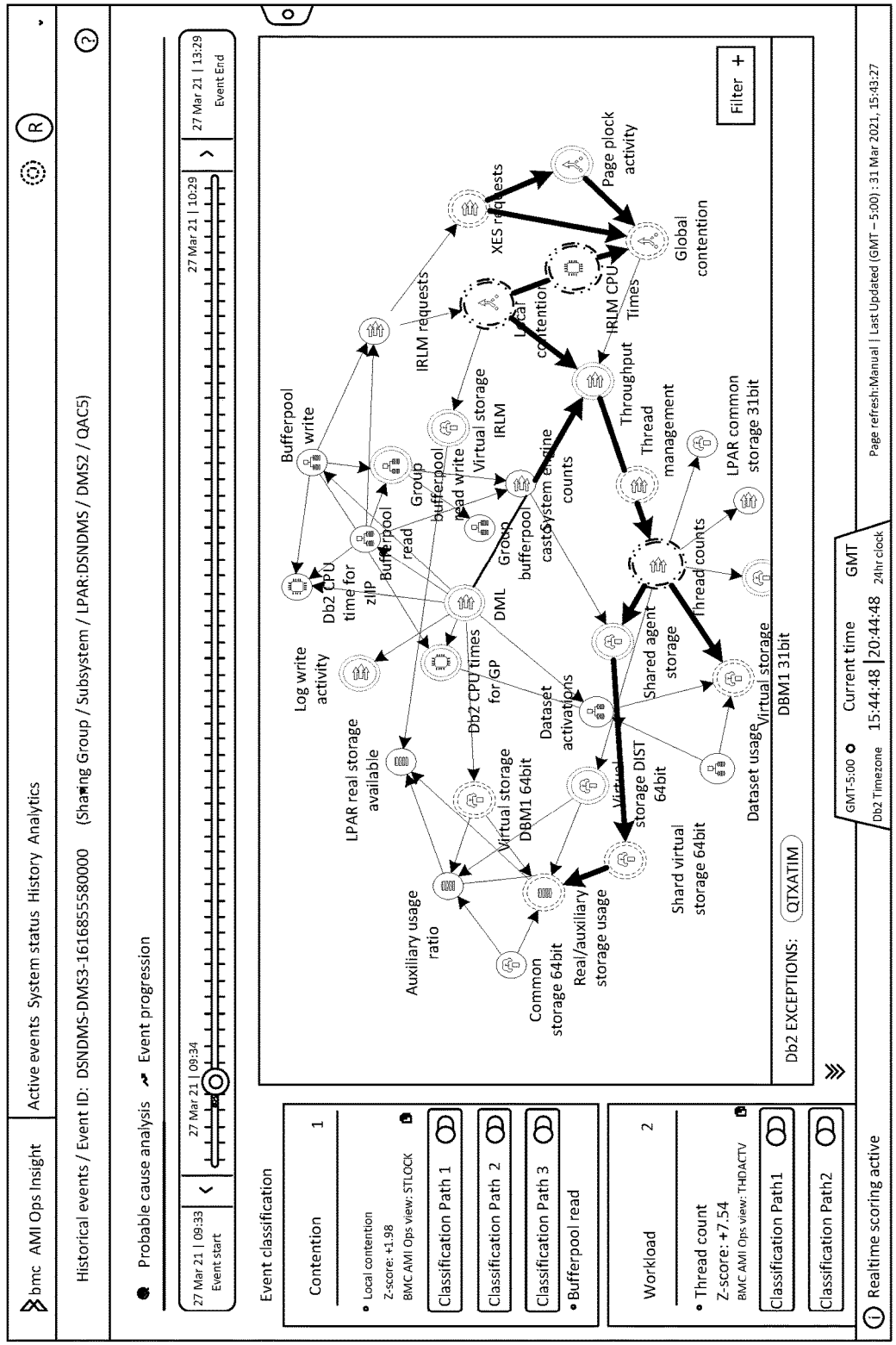
Figure 19:
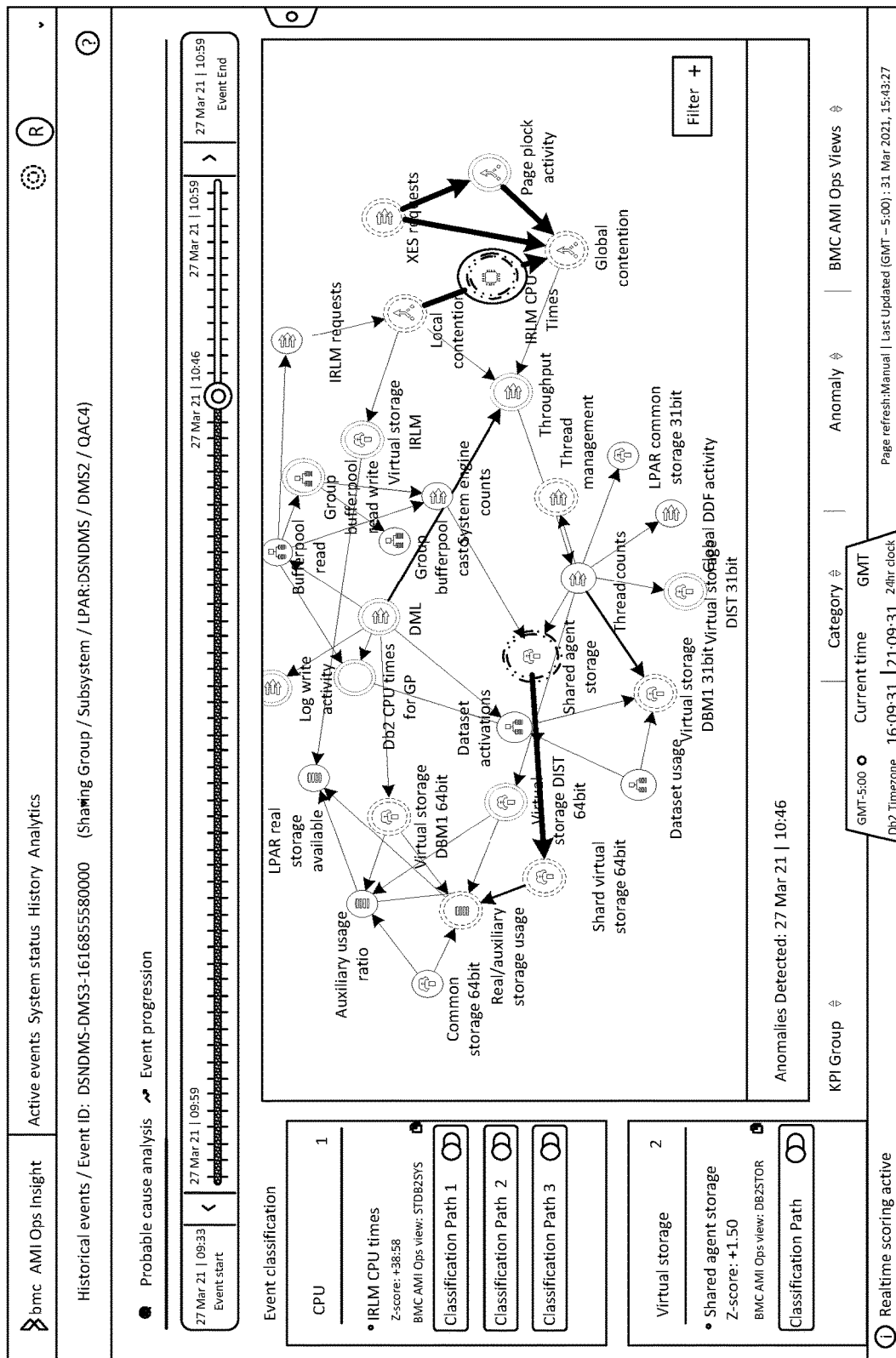

FIG. 13 is a flowchart illustrating example operations of the monitoring system 100 of FIG. 1 for FIGS. 6 through 12. In the example of FIG. 13, causal relationships between pairs of nodes may be defined (1302), and an event graph schema may be generated (1304). The causal relationships may each be provided with score-dependent validity criteria, as described herein. Once deployed, node scores may be generated (1306) on a real-time basis. As sets of scores are generated, the validities of each of directional edges may be evaluated (1308) using the score-dependent validity criteria of each edge.

Paths may then be generated using at least some of the valid edges of connected nodes (1310). Path generation may include consolidation of any path that is included within a larger path. Path generation may include filtering paths that have fewer than a certain number of nodes (e.g., three, as shown in FIG. 13), or greater than a certain number of nodes.

Generating the path may include executing any rules for prioritizing inclusion of limit breach nodes. For example, a limit breach node may be added back even if that node is not otherwise included within a path based on existing path-generation rules.

Paths may then be evaluated (1312) e.g., to identify a root cause node, including providing visual indication or highlighting of the root cause node. If a root cause node is also a limit breach node, the limit breach may be prioritized and additional visual indications may be provided, such as the limit breach indicators, 1206 and/or 1224 of FIG. 12. Where path inversion is used, for example when a first node of a path has a negative anomalous score, the path inversion's iteration loop may be shown.

Additionally, root cause classification and analysis may be provided (1313). Such analysis may be specific to a type and/or circumstance of the root cause. For example, for contention-related root cause nodes, resources being held may be identified or longest wait times may be identified. Analysis may explain why a resource is being held by other resources or provide explanation regarding specific causes and effects. For example, information used originally to define causes (and associated effects) in the event graph schema of FIG. 6 may be used.

A positioning algorithm may be executed (1314). For example, as described above, the positioning algorithm may be configured to reduce a length of a path by positioning path nodes in proximity to one another. The positioning algorithm may be configured to group similar types of nodes close to one another, or to position in proximity nodes with similar anomaly scores.

The positioning algorithm may be executed at each score update and may also be executed in response to user selections. For example, the positioning algorithm may be configured to re-position nodes and edges in response to a user selection of a specific path or of a specific node.

An event classifier may be trained and deployed (1316). For example, as described above, the event classifier 124 of FIG. 1 may be trained and deployed. For example, at each iteration of the example of FIG. 13, collected data may be stored in a flat file of all the individual and group scores of the various KPIs and KPI groups (nodes), together with the corresponding event classification as just described. The scores and event classifications therefore provide auto-generated, labelled training data, suitable for use in many different types of supervised ML algorithms.

Such algorithms may be used to predict future events, or to predict a scale, nature, extent, or other aspect of such future events. Consequently, described techniques provide proactive, as well as reactive, measures to be taken to optimize an operation and performance of a technology landscape.

Moreover, as iterations of scoring and classifying proceed, an additional feedback loop is provided that enables optimization and tuning of the overall process of FIG. 13. For example, by classifying events at a level of individual KPI scores (rather than groups of KPIs), it is possible to re-group KPIs in ways that enable more accurate recognition, classification, and prediction of events. In such cases, it may be necessary or desirable to update or redefine the causal relationships between nodes (1302), including updating the score-dependent validity criteria associated with each edge and corresponding node pair.

FIGS. 14 through 20 are additional screenshots illustrating further example implementations of the system of FIG. 1. As further shown in these additional examples, and as described above, multiple classification paths may be generated for each actual or potential root cause node. Further analysis may be provided to select between and/or inspect each classification path and its relative contribution to the event being classified.

The graphs of FIGS. 14 through 20 may be interactive. For example, a user may hover over a node to see its corresponding score. FIGS. 14 through 20 show similar examples of root cause analysis and related event classification. As shown by the included timelines, and as referenced above, the various graphs and included paths may be generated every minute, as new scores are received. Thus, events may be classified, e.g., as a workload event or an IO event, or any known or future type of event.

In some implementations, resulting event classifications may be stored together with the corresponding scores. The resulting file may then be used as labelled training data to train additional ML models, which may then be used to predict future similar events before they occur. In other words, the techniques described herein may be used to auto-generate training labels and thereby obtain training data for predictive ML models that would otherwise be difficult or infeasible to obtain or provide manually.

The described techniques thus provide dynamic classification and reclassification of events, anomalies, and relationships. For example, as the valid paths are identified and generated each minute, relationships between a single pair of nodes may or may not occur, depending on the current score values of the two nodes and the nature of the underlying graph control file.

Described implementations also help avoid false positive events. For example, isolated anomalous scores may be less likely to require resources or be identified for further evaluation, as compared to anomalies identified as being part of an event path as described herein. Put another way, the system of FIG. 1 may be configured to generate an alert only when identified anomalies have been effectively filtered by the path identification and evaluation techniques described herein, thereby eliminating isolated anomalous scores that are less likely to be associated with an event, even if related to a performance metric with a high score importance.

Such filtering provided by the described techniques may be enhanced by various types of desired parameterization. For example, the above-referenced importance levels (or other existing parameters) associated with specific performance metrics may be used to filter or prioritize path results.

Figure 20:
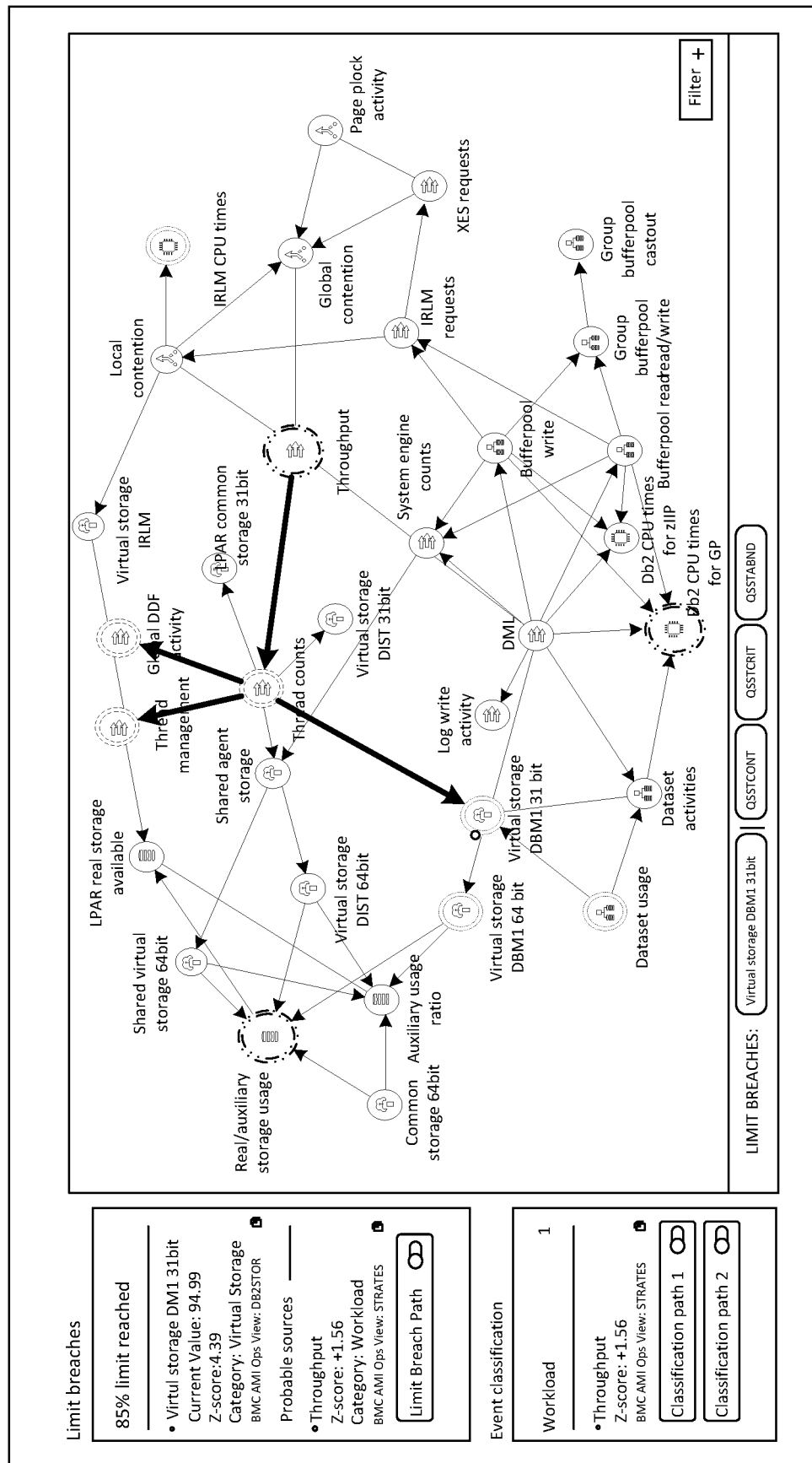

In additional or alternative examples, the path analysis may be parameterized to only return paths having 3 or more nodes (or two or more relationships, or edges). Such an approach would filter paths that have only a pair of nodes and a corresponding single relationship or edge. In general, such approaches may be referred to as setting a desired path depth of inquiry. As shown in FIG. 20, however, a limit breach may be used to provide an exception to this type of filtering, such as in cases where significant or extreme thresholds have been breached.

For example, described scoring techniques provide scores associated with anomalous performance metric values that may or may not ultimately be associated with an event (e.g., may represent a false positive, as referenced). In some cases, however, a performance metric value may be so far removed from a desired operating range that the resulting score is surely, or almost surely, associated with a system freeze, malfunction, crash, failure, or other event. In such cases, the restriction of requiring a minimum path depth of inquiry may be removed for the relevant performance metric and associated score, and a node may be highlighted as a root cause node even when not connected by a valid path to any other node, or connected by a valid path to only a single other node, or otherwise violating a path depth of inquiry limit that may be in place.

Put another way, FIG. 20 illustrates that the dynamic removal of a node or path may be reversed to capture a limit breach. Thus, the techniques of FIG. 20 illustrate the inclusion and enable dynamic classification of such limit breaches.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatuses, e.g., a programmable processor, a computer, a server, multiple computers or servers, or other kind(s) of digital computer(s). A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:
   determine an event graph schema for a technology landscape, the technology landscape being characterized by scores assigned to performance metrics for the technology landscape, wherein the event graph schema includes a plurality of nodes corresponding to the performance metrics and the scores, and includes directional edges connecting node pairs of the plurality of nodes, each directional edge having a score-dependent validity criterion defined by the scores of a corresponding node pair;
   determine anomalous scores of the scores associated with an event within the technology landscape;
   determine, from the anomalous scores, anomalous nodes;
   generate an event graph instance of the event graph schema to obtain at least one causal path, including designating, in the event graph schema, at least one invalid edge of the directional edges for which a corresponding score-dependent validity criterion of a corresponding node pair is not met, and instantiating valid edges from the directional edges for inclusion in the at least one causal path, each valid edge connecting two of the anomalous nodes and meeting the score-dependent validity criterion of corresponding directional edges;
   determine the at least one causal path that includes the valid edges and connected anomalous nodes; and
   traverse the at least one causal path to identify at least one of the connected anomalous nodes as a root cause node of the event.

2. The computer program product of claim 1, wherein the scores have positive and negative signs, and satisfaction of the score-dependent validity criterion is defined based on combinations of the positive and negative signs, and on score values of the scores.

3. The computer program product of claim 1, wherein each directional edge defines a cause and effect relationship between the corresponding node pair.

4. The computer program product of claim 1, wherein the instructions, when executed, are further configured to cause the at least one computing device to:
   determine the anomalous scores from scores assigned to the performance metrics using a trained machine learning model.

5. The computer program product of claim 1, wherein the instructions, when executed, are further configured to cause the at least one computing device to:
   display the event graph instance, including visually identifying the at least one causal path and the root cause node.

6. The computer program product of claim 1, wherein the instructions, when executed, are further configured to cause the at least one computing device to:
   determine a second causal path, including second valid edges, second anomalous nodes, and a second root cause node;
   display the event graph instance with a selection option for displaying either or both of the second causal path and the at least one causal path; and
   classify the event with respect to inclusion of both the second causal path and the at least one causal path.

7. The computer program product of claim 1, wherein the instructions, when executed, are further configured to cause the at least one computing device to:
   traverse the at least one causal path including traversing from a path end node of the at least one causal path to a first node of the at least one causal path;
   evaluate whether the first node qualifies as a potential root cause node;
   if so, designate the first node as the root cause node; and
   if not, traverse the at least one causal path back towards the path end node until the root cause node is reached.

8. The computer program product of claim 1, wherein the instructions, when executed, are further configured to cause the at least one computing device to:
   determine that a limit breach node of the nodes is associated with a limit breach value that exceeds a limit breach threshold; and
   include the limit breach node within the at least one causal path.

9. The computer program product of claim 8, wherein the instructions, when executed, are further configured to cause the at least one computing device to:
   display the event graph instance with the at least one causal path; and
   visually identify the root cause node and the limit breach node within the event graph instance.

10. The computer program product of claim 1, wherein the instructions, when executed, are further configured to cause the at least one computing device to:
    store the scores in association with the event to obtain labelled training data;
    train a machine learning model using the labelled training data and a supervised machine learning algorithm; and
    predict a future event, based on the trained machine learning model and current values of the scores.

11. The computer program product of claim 1, wherein the instructions, when executed by the at least one computing device, are configured to cause the at least one computing device to:
  determine the at least one causal path at a first time;
  determine second anomalous scores associated with a second event within the technology landscape at a second time;
  generate, based on the second anomalous scores, a second instance of the event graph schema to obtain a second causal path; and
  traverse the second causal path to identify at least one of the connected anomalous nodes as a second root cause node of the second event.

12. A computer-implemented method, the method comprising:
  accessing, from a memory, an event graph schema for a technology landscape, the technology landscape being characterized by scores assigned to performance metrics for the technology landscape, wherein the event graph schema includes a plurality of nodes corresponding to the performance metrics and the scores, and includes directional edges connecting node pairs of the plurality of nodes, each directional edge having a score-dependent validity criterion defined by scores of a corresponding node pair;
  interfacing with components of the technology landscape to determine anomalous scores of the scores associated with an event within the technology landscape, to thereby determine anomalous nodes;
  generate an event graph instance of the event graph schema to obtain at least one causal path, including designating, in the event graph schema, at least one invalid edge of the directional edges for which a corresponding score-dependent validity criterion of a corresponding node pair is not met, and instantiating valid edges from the directional edges for inclusion in the at least one causal path, each valid edge connecting two of the anomalous nodes and meeting the score-dependent validity criterion of corresponding directional edges;
  determining the at least one causal path that includes the valid edges and connected anomalous nodes;
  traversing the at least one causal path to identify at least one of the connected anomalous nodes as a root cause node of the event; and
  displaying the root cause node.

13. The method of claim 12, further comprising:
  determining the anomalous scores from scores assigned to the performance metrics using a trained machine learning model.

14. The method of claim 12, further comprising:
  displaying the event graph instance including the at least one causal path, including visually identifying the root cause node.

15. The method of claim 12, further comprising:
  determining a second causal path, including second valid edges, second anomalous nodes, and a second root cause node;
  displaying the event graph instance with a selection option for displaying either or both of the second causal path and the at least one causal path; and
  classifying the event with respect to inclusion of both the second causal path and the at least one causal path.

16. The method of claim 12, further comprising:
  traversing the at least one causal path including traversing from a path end node of the at least one causal path to a first node of the at least one causal path;
  evaluating whether the first node qualifies as a potential root cause node;
  if so, designating the first node as the root cause node; and
  if not, traversing the at least one causal path back towards the path end node until the root cause node is reached.

17. A system comprising:
  at least one memory including instructions; and
  at least one processor that is operably coupled to the at least one memory and that is arranged and configured to execute the instructions, which, when executed, cause the at least one processor to:
  determine an event graph schema for a technology landscape, the technology landscape being characterized by scores assigned to performance metrics for the technology landscape, wherein the event graph schema includes a plurality of nodes corresponding to the performance metrics and the scores, and includes directional edges connecting node pairs of the plurality of nodes, each directional edge having a score-dependent validity criterion defined by scores of a corresponding node pair;
  determine, from anomalous scores of the scores associated with an event within the technology landscape, anomalous nodes of the nodes;
  generate an event graph instance of the event graph schema to obtain at least one causal path, including designating, in the event graph schema, at least one invalid edge of the directional edges for which a corresponding score-dependent validity criterion of a corresponding node pair is not met, and instantiating valid edges from the directional edges for inclusion in the at least one causal path, each valid edge connecting two of the anomalous nodes and meeting the score-dependent validity criterion of corresponding directional edges;
  determine the at least one causal path that includes the valid edges and connected anomalous nodes; and
  traverse the at least one causal path to identify at least one of the connected anomalous nodes as a root cause node of the event.

18. The system of claim 17, wherein the instructions, when executed, are further configured to cause the at least one processor to:
  determine the anomalous scores from scores assigned to the performance metrics using a trained machine learning model.

19. The system of claim 17, wherein the instructions, when executed, are further configured to cause the at least one processor to:
  display the event graph instance including the at least one causal path, including visually identifying the root cause node.

20. The system of claim 17, wherein the instructions, when executed, are further configured to cause the at least one processor to:
  determine a second causal path, including second valid edges, second anomalous nodes, and a second root cause node;
  display the event graph instance with a selection option for displaying either or both of the second causal path and the at least one causal path; and
  classify the event with respect to inclusion of both the second causal path and the at least one causal path.

21. The system of claim 17, wherein the instructions, when executed, are further configured to cause the at least one processor to:
- traverse the at least one causal path including traversing from a path end node of the at least one causal path to a first node of the at least one causal path;
- evaluate whether the first node qualifies as a potential root cause node;
- if so, designate the first node as the root cause node; and
- if not, traverse the at least one causal path back towards the path end node until the root cause node is reached.

\* \* \* \* \*